United States Patent
Rowan et al.

(10) Patent No.: US 6,529,303 B1
(45) Date of Patent: Mar. 4, 2003

(54) OPTICAL COMMUNICATIONS NETWORKS UTILIZING FREQUENCY DIVISION MULTIPLEXING

(75) Inventors: Michael W. Rowan, Los Gatos, CA (US); David B. Upham, Sunnyvale, CA (US); Augustus Elmer, San Jose, CA (US); Laurence J. Newell, Saratoga, CA (US); David A. Pechner, San Jose, CA (US); Abraham Kou, San Jose, CA (US); James F. Coward, La Honda, CA (US); Norman L. Swenson, Mountain View, CA (US); Minnie Ho, Palo Alto, CA (US); Peter H. Chang, San Jose, CA (US); Ting K. Yee, Foster City, CA (US); Stuart E. Wilson, Menlo Park, CA (US)

(73) Assignee: Kestrel Solutions, Inc., Mountain View, CA (US)

( * ) Notice: Subject to any disclaimer, the term of this patent is extended or adjusted under 35 U.S.C. 154(b) by 0 days.

(21) Appl. No.: 09/405,367

(22) Filed: Sep. 24, 1999

Related U.S. Application Data

(63) Continuation-in-part of application No. 09/372,143, filed on Aug. 20, 1999, which is a continuation-in-part of application No. 09/229,594, filed on Jan. 13, 1999, now Pat. No. 6,452,945, which is a continuation-in-part of application No. 09/035,630, filed on Mar. 5, 1998.

(51) Int. Cl.[7] .............................................. H04J 14/02
(52) U.S. Cl. ....................... 359/128; 359/127; 359/189; 370/480
(58) Field of Search .................................... 359/128, 127, 359/189, 124, 181, 184, 115, 132, 125; 370/480, 340, 535, 536, 537, 538, 481, 483

(56) References Cited

U.S. PATENT DOCUMENTS

| | | | |
|---|---|---|---|
| 4,061,577 A | 12/1977 | Bell | ............................ 250/199 |
| 4,701,904 A | 10/1987 | Darcie | ............................ 370/3 |

(List continued on next page.)

FOREIGN PATENT DOCUMENTS

EP 0 756 393 A1 1/1997

OTHER PUBLICATIONS

Hill, Paul M., et al., "Multigigabit Subcarrier Multiplexed Coherent Lightwave System," *Journal of Lightwave Technology*, vol. 10, No. 11, Nov. 1992, pp. 1656–1664.

(List continued on next page.)

*Primary Examiner*—Nina Tong
(74) *Attorney, Agent, or Firm*—Fenwick & West LLP

(57) ABSTRACT

A frequency division multiplexing (FDM) node used in optical communications networks provides add-drop multiplexing (ADM) functionality between optical high-speed channels and electrical low-speed channels. The FDM node includes a high-speed system and an ADM crosspoint. The high-speed system converts between an optical high-speed channel and its constituent electrical low-speed channels through the use of frequency division multiplexing and preferably also QAM modulation. The ADM crosspoint couples incoming low-speed channels to outgoing low-speed channels, thus implementing the ADM functionality for the FDM node.

58 Claims, 16 Drawing Sheets

U.S. PATENT DOCUMENTS

| | | | |
|---|---|---|---|
| 4,704,715 A | 11/1987 | Shibagaki et al. | |
| 4,953,156 A | 8/1990 | Olshansky et al. | 370/3 |
| 5,018,135 A | 5/1991 | Ashi et al. | |
| 5,111,323 A | 5/1992 | Tanaka et al. | |
| 5,134,609 A | 7/1992 | Mori et al. | |
| 5,278,824 A * | 1/1994 | Kremer | 370/223 |
| 5,311,501 A | 5/1994 | Takatsu | |
| 5,351,148 A | 9/1994 | Maeda et al. | 359/124 |
| 5,387,927 A | 2/1995 | Look et al. | 348/6 |
| 5,430,568 A | 7/1995 | Little et al. | 359/124 |
| 5,461,612 A | 10/1995 | Göckler et al. | 370/55 |
| 5,488,500 A * | 1/1996 | Glance | 359/127 |
| 5,559,561 A | 9/1996 | Wei | 348/470 |
| 5,564,021 A * | 10/1996 | Qiu et al. | 340/825.2 |
| 5,576,874 A | 11/1996 | Czerwiec et al. | 359/123 |
| 5,596,436 A | 1/1997 | Sargis et al. | 359/132 |
| 5,612,805 A * | 3/1997 | Fevrier et al. | 359/124 |
| 5,680,238 A | 10/1997 | Masuda | 359/132 |
| 5,701,186 A * | 12/1997 | Huber | 359/125 |
| 5,896,387 A | 4/1999 | Fujita et al. | |
| 5,930,231 A | 7/1999 | Miller et al. | 370/210 |
| 6,078,412 A | 6/2000 | Fuse et al. | 359/124 |
| 6,111,676 A | 8/2000 | Lemus et al. | |
| 6,144,428 A | 11/2000 | Schadt et al. | |
| 6,144,786 A | 11/2000 | Chethik | |
| 6,201,788 B1 * | 3/2001 | Ishiwatari | 359/119 |
| 6,288,808 B1 | 9/2001 | Lee et al. | |
| 6,335,810 B1 | 1/2002 | Uehara | |
| 6,407,843 B1 * | 6/2002 | Rowan et al. | 359/189 |
| 6,452,945 B1 * | 9/2002 | Upham et al. | 370/480 |

OTHER PUBLICATIONS

Schlump, Dieter et al.: "Electronic equalization of PMD and chromatic dispersion induced distortion after 100 km standard fibre at 10 Gbit/s" Proceedings Of The European Conference On Optical Communication, Sep. 20, 1998, pp. 535–536.

Alcatel, "Alcatel 1680 SM 10 Gbps (STM–64) Add Drop Multiplexer," copyright 1997 (printed from http://www.alcatel.com/telecom/mbd/products/products/1680sm.htm on May 24, 1999), pp. 1–4.

Alcatel, "Alcatel 1692 SM 10 Gbps (OC–192) Sonet Transport System," copyright 1997 (printed from http://www.alcatel.com/telecom/mbd/products/products/1692.htm on May 24, 1999), pp. 1–2.

Alcatel, "The Optinex Family of Network Elements," copyright 1997 (printed from http://www.alcatel.com/telecom/tsd/products/family.htm on May 24, 1999), pp. 1–7.

*Business Wire*, "Harmonic Lightwaves Announces Availability of First MCNS–Compliant QAM Modulator; TRANsend QAM is a Vital Component for Delivering Digital Services," Nov. 18, 1997.

C. Tai, Pi–Yang Chiang, W. Way, "Eight–Way, 70–km Transmission of 33–Channel 64–QAM Signals Utilizing a 1.3–μm External Modulation System and Semiconductor Optical Amplifier," *IEEE Photonics Technology Letters*, vol. 8, No. 9, Sep. 1996, pp. 1244–1248.

Cambrian Systems Corporation, "OPTera Metro Optical Networking Platform Product Information," copyright 1997 (printed from http://www.cambriansys.com/productinfo.htm on May 24, 1999), pp. 1–4.

D. Tang, "Multi–Gigabit Fiber–Optic Video Distribution Network Using BPSK Microwave Subcarriers," *IEEE 1989 MTT–S Intl. Microwave Symp Digest*, Jun. 13–15, 1989, Long Beach, CA, vol. 2, pp. 697–701.

E. Douverne, M. Ottka, K. Ruthemann, K. Siegel, "Ein 64–QAM–Modern für SDH–Richtfunkgeräte mit integriertem Kreuzpolarisationsentkoppler," vol. 40, No. 11, Mar. 1, 1994, pp. 89–100.

Fujitsu Network Communications, Inc., "Flash–192 Fujitsu Lightwave Add/Drop Multiplexer," copyright 1997 (printed from http://www.fnc.fujitsu.com/technology/falsh192.htm on May 24, 1999), pp. 1–4.

G Wilson, "Capacity of QAM SCM systems utilising optically linearised Mach–Zehnder modulator as transmitter," *Electronic Letters*, vol. 34, No. 25, Dec. 10, 1998, pp. 2372–2374.

H. Dai, C. Lin, M. Ramachandran, "Hybrid AM/QAM Video Trunking Lightwave Sytems With Cascaded EDFAs," *Conf. Proc. LEOS, 97 Annual Meeting, IEEE Lasers & Electro Optic Society*, 1997, vol. 1, pp. 319–320.

H. Jones–Bey, "Optical switches pursue crossconnect markets," *Laser Focus World*, May 1998, pp. 153–162.

H. Ohtsuka, O. Kagami, S. Aikawa, H. Takanashi, "256–QAM Subcarrier Transmission for Broadband Distribution Networks," NTT Radio Communications Systems Laboratories, *GlobeCom '91*, pp. 1817–1822.

Hitachi Telecom (USA) Inc., "OC–192 AMN5192 Sonet Node," Jul. 1998, pp. 1–2.

I–Cube, "Designing a Large Crosspoint With Fast Reconfiguration," *Literature* #D–22–013, Sep. 1997, pp. 1–9.

I–Cube, "IQX Family Data Sheet," Jan. 1999, pp. 1–58.

I–Cube, "Optimal I/O Assignment in an IQX–based Crossbar Switch," *Literature* #D–21–019, Sep. 1997, pp. 1–14.

J. LeBer, M. LeLigne, "Digital Transmission on Electric Subcarriers in Optical Fiber Videocommunication Systems," *Optics Communications*, Oct. 15, 1987, vol. 64, No. 2, pp. 120–126.

J. Li, K. Yano, "Development of AM/QAM Hybrid Optical SCM Transmission System," *Proc Intl Conf. On Communication Technology ICCT '96*, May 5–7, 1996, Beijing, China, vol. 1, pp. 575–577.

J. Park, A. Elrefaie, K. Lau, "1550–nm Transmission of Digitally Modulated 28–GHz Subcarriers Over 77 km of Nondispersion Shifted Fiber," *IEEE Photonics Technology Letters*, Feb. 1997, vol. 9, Issue 2, pp. 256–258.

J. Ryan, "WDM: North American Deployment Trends," *IEEE Communications Magazine*, Feb. 1998, pp. 40–44.

K. Ho, H. Dai, C. Lin, "Hybrid WDM Digital Trunking System for both HFC and FTTC Access Networks," *Digest IEEE/LEOS 1996 Summer Topical Meetings* (Cat. No. 96th 8164), NY, NY, pp. 37–38.

Ken–ichi Kitayama, "Subcarrier Multiplexing Based Signaling and Access Control in Optical FDM Networks," *IEEE Global Telecomuunications Conference* (Globecom'95, Singapore), Nov. 1995, pp. 1996–2002.

M. Fuse, Y. Kudo, K. Maeda, "Development of 128 Optical Distribution System of 150 chs AM/QAM Hybrid Signals," *Electronics and Communications in Japan*, Nov. 1996, vol. 79, Issue 11, Part 1, pp. 65–77.

M. Kavehrad, E. Savov, "Fiber–Optic Transmission of Microwave 64–QAM Signals," *IEEE Journal of Selected Areas in Communications*, vol. 8, No. 7, Sep. 1990, pp. 1320–1326.

N. Kanno, K. Ito, "Fiber Optic Subcarrier Multiplexing Transport for Broadband Subscriber Distribution Network," *IEEE Intl. Conference on Communications Boston ICC/89 World Prosperity Through Communications*, Jun. 11–14, 1989, Boston, MA, vol. 2, pp. 996–1003.

Nortel, "S/DMS Transport Node OC–192 System," Issue 1, Sep. 25, 1995, pp. 1–25.

P. Green, "Fiber Optic Networks," 1993, Prentice–Hall, Inc., Englewood Cliffs, New Jersey, p. 331, line4—line 7, figure 9–1.

V. Swaminathan, N. Froberg, L. Upadhyayula, "The end-to-end bit error performance of 64–quadrature amplitude modulated signals in a hybrid AM–vestigial sideband/QAM fiber–optic video transmission system," *Proceedings of SPIE–International Society for Optical Engineering*, vol. 2917, pp. 274–282.

X. Lu, G.E. Bodeep, T.E. Darcie, "Broad–Band AM–VSB/64 QAM Cable TV System Over Hybrid Fiber/Coax Network," *IEEE Photonics Technology Letters*, vol. 7, No. 4, Apr. 1995, pp. 330–332.

Y. Nakamura, H. Ohtsuka, S. Aikawa, H. Takanashi, "Advanced Techniques for Super Multi–Carrier Digital Microwave Radio With Trellis–Coded 256 QAM Modulation," *NTT Radio Communication Systems Laboratories*, pp. 389–394.

* cited by examiner

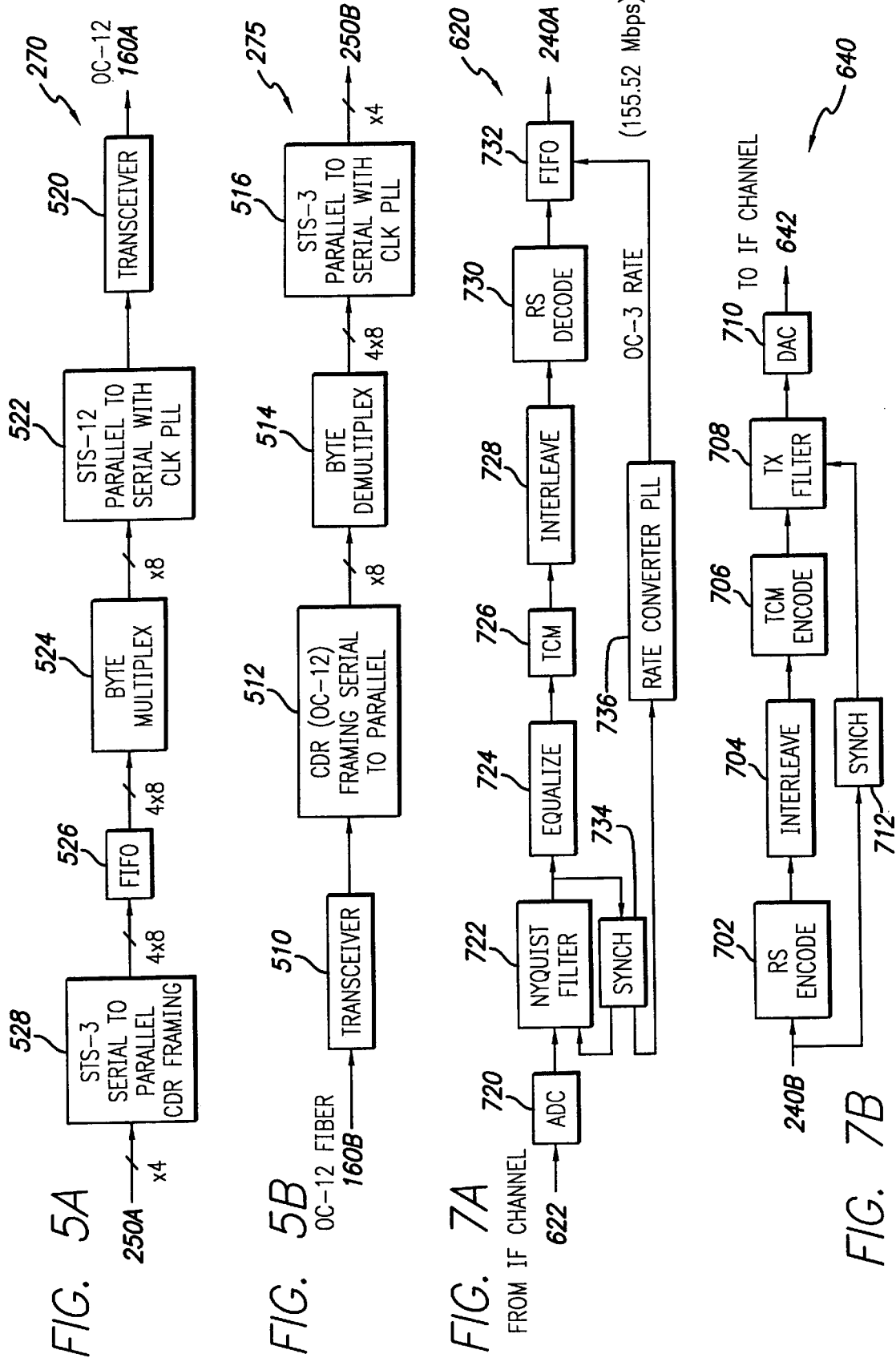

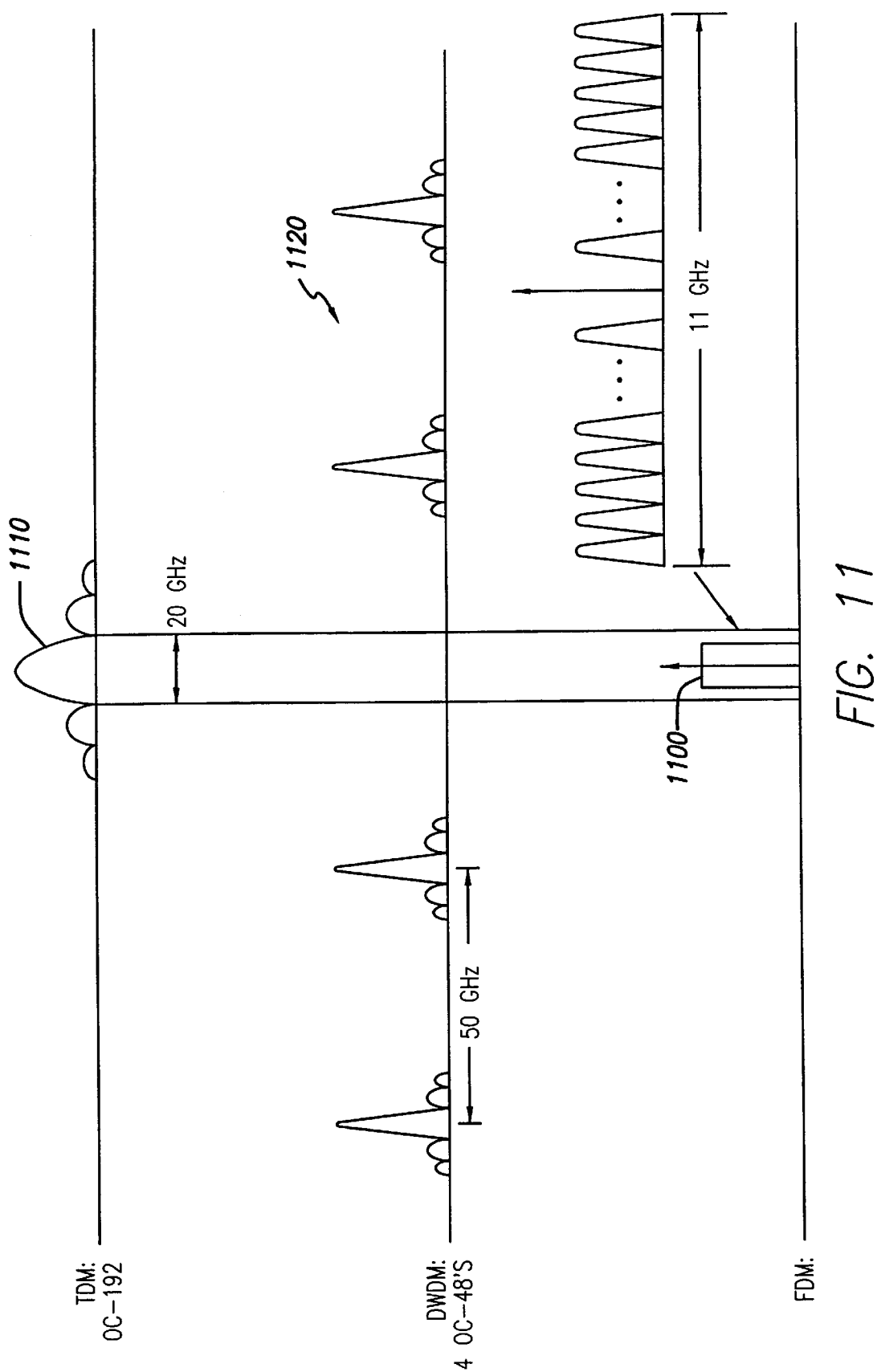

OPTICAL COMMUNICATIONS NETWORKS UTILIZING FREQUENCY DIVISION MULTIPLEXING

CROSS-REFERENCE TO RELATED APPLICATIONS

This application is a continuation-in-part of pending U.S. patent application Ser. No. 09/372,143, "Optical Communications Utilizing Frequency Division Multiplexing and Wavelength-Division Multiplexing," by Peter H. Chang, Ting K. Yee, Michael W. Rowan, James F. Coward, and Stuart E. Wilson, filed Aug. 20, 1999; which is a continuation-in-part of U.S. patent application Ser. No. 09/229,594, "Electrical Add-Drop Multiplexing for Optical Communications Networks Utilizing Frequency Division Multiplexing," by David B. Upham, Augustus Elmer, Laurence J. Newell, David A. Pechner, Abraham Kou, Michael W. Rowan, James F. Coward, Norman L. Swenson, and Minnie Ho, filed Jan. 13, 1999 now U.S. Pat. No. 6,452,945; which is a continuation-in-part of U.S. patent application Ser. No. 09/035,630, "System and Method for Spectrally Efficient Transmission of Digital Data over Optical Fiber", by Michael W. Rowan, Roger R. Taur, Peter Chang, James F. Coward, Stuart Wilson, and Ting K. Yee, filed Mar. 5, 1998. The subject matter of all of the foregoing is incorporated herein by reference.

BACKGROUND OF THE INVENTION

1. Field of the Invention

This invention relates generally to the field of optical fiber communications. More specifically, the invention relates to the use of frequency-division multiplexing (FDM) in optical fiber communications systems.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3 and OC-3 connections in the near future. As a result, the networking infrastructure will be required to accommodate greatly increased traffic.

Optical fiber is a transmission medium that is well-suited to meet this increasing demand. Optical fiber has an inherent bandwidth which is much greater than metal-based conductors, such as twisted pair or coaxial cable; and protocols such as the OC protocol have been developed for the transmission of data over optical fibers. Typical communications system based on optical fibers include a transmitter, an optical fiber, and a receiver. The transmitter converts the data to be communicated into an optical form and then transmits the resulting optical signal via the optical fiber to the receiver. The receiver recovers the original data from the received optical signal.

One approach to address the increasing demand for communications bandwidth is to simply add more optical fiber to the current networking infrastructure. However, this is not always a viable alternative. There are many areas of the country, for example metropolitan areas, where the ducts or conduits carrying optical fiber are filled to capacity or where the fiber was originally buried directly into the ground. In addition, adding more fiber is often both prohibitively expensive and time-consuming, due to high installation costs and local resistance to the disruption caused by fiber installation. These factors therefore favor solutions which increase communications bandwidth by more efficiently utilizing the installed fiber infrastructure rather than by installing new fiber.

Furthermore, other factors also favor solutions other than installing new fiber. For example, because of its large inherent bandwidth, an optical fiber is most efficiently used when multiple users share the fiber. Typically, a number of low-speed data streams (i.e., "low-speed channels"), for example transmitted by different users, are combined into a single high-speed channel for transport across the fiber. Conversely, when the high-speed channel reaches the destination for one of the low-speed channels contained in it, the low-speed channel must be extracted from the rest of the high-speed channel. A typical optical network consists of nodes which transmit high-speed channels to each other over optical fibers. In addition to transporting low-speed channels through the node (the "pass-through" function) as part of high-speed channels passing through the node, nodes may also combine incoming low-speed channels to the high-speed channel (the "add" function) and/or extract outgoing low-speed channels from the high-speed channels (the "drop" function). These functions are commonly referred to as add-drop multiplexing (ADM).

Increasing the ADM functionality of nodes in a network increases the flexibility of the network, thus increasing the number of applications and network configurations that may be implemented by the network. For example, metropolitan networks are characterized by densely populated areas, a large number of nodes (e.g., central offices), short distances between nodes (typically less than 40 km), and lower data rates than long distance networks (typically less than 2.5 Gbps). The traffic patterns for metropolitan networks change rapidly and require dynamic interconnections at the large number of nodes, which are often remotely managed. ADM functionality allows low-speed channels to be remotely added to or dropped from a high-speed channel, thus addressing the requirements of the metropolitan network.

However, the manner in which the ADM functionality is implemented in a particular network will depend in part on how the low-speed channels are combined to form a high-speed channel. Thus, an approach which addresses the capacity problem by combining a large number of low-speed channels into a high-speed channel may not be favored if it does not readily support ADM functionality. A good approach should both increase the number of low-speed channels contained in each high-speed channel and also support significant ADM functionality.

Two widely used approaches to combining low-speed channels are wavelength division multiplexing (WDM) and time division multiplexing (TDM). In WDM or its more recent counterpart dense wavelength division multiplexing (DWDM), each low-speed channel is placed on an optical carrier of a different wavelength and the different wavelength carriers are combined to form the high-speed channel. Crosstalk between the low-speed channels is a major concern in WDM and, as a result, the wavelengths for the optical carriers must be spaced far enough apart (typically 50 GHz or more) so that the different low-speed channels are resolvable. In TDM, each low-speed channel is compressed into a certain time slot and the time slots are then combined on a time basis to form the high-speed channel. For example, in a certain period of time, the high-speed channel may be capable of transmitting 10 bits while each low-speed channel may only be capable of transmitting 1 bit. In this case, the first bit of the high-speed channel may be allocated to low-speed channel 1, the second bit to low-speed channel 2, and so on, thus forming a high-speed channel containing 10 low-speed channels. TDM requires precise synchronization of the different channels on a bit-by-bit basis (or byte-by-byte basis, in the case of SONET), and a memory buffer is typically also required to temporarily store data from the low-speed channels.

In the case of WDM, one approach is to implement the ADM functionality entirely in the optical domain. This avoids having to convert the high-speed channel from optical to electrical form, but has a number of other significant limitations. First, as described previously, the wavelengths for each of the optical carriers in a WDM system typically are spaced far apart (e.g. 50 GHz or more). As a result, the number of different optical carriers is limited and if each carrier corresponds to a low-speed channel, as is typically the case, the total number of low-speed channels is also limited. Furthermore, if the bandwidth capacity of the fiber is to be used efficiently, each low-speed channel must have a relatively high data rate due to the low number of low-speed channels, thus preventing add-drop at a fine granularity. For example, if the high-speed channel has a total capacity of 10 Gigabits per second (10 Gbps) and is allotted a bandwidth of 200 GHz, then current WDM systems will typically be limited to no more than four low-speed channels, each of which will be 2.5 Gbps in order to meet the overall bit rate of the high-speed channel. However, this means that the low-speed channels can only be added or dropped in blocks of 2.5 Gbps. Since many data streams occur at a much lower bit rate, such as at 155 Megabits per second (Mbps) for OC-3, it is often desirable to add and drop at a granularity which is finer than what WDM can support.

The current state of technology also limits the practicality of all-optical ADM. In all-optical approaches, the channels typically are not regenerated as they pass through each node in the network and will continuously deteriorate until they reach their final destination. As a result, the entire network must be designed assuming deterioration along the worst-case path through the network. In contrast, if a channel is regenerated at each node, the network may be designed based only on node-to-node deterioration, regardless of the total number of nodes in the network. As another example, current technology makes it difficult to route a low-speed channel occupying one wavelength of a high-speed channel to a different wavelength of the high-speed channel. This severely limits the ADM functionality that may be implemented since low-speed channels are not freely routable. For example, if a low-speed channel occupies a particular wavelength on an incoming high-speed channel, that low-speed channel can only be passed through to another high-speed channel if that particular wavelength on that high-speed channel is unoccupied, regardless of how many other wavelengths are available.

An alternate approach to implementing ADM functionality for WDM systems is based on converting the optical high-speed channels to electrical form and then performing the ADM function electrically. This approach, however, is expensive since it requires significant amounts of both optical and electrical devices. WDM is an inherently optical approach and requires optical devices to implement. On the other hand, an electrical ADM would require significant electrical devices to implement. Combining the two would require both sets of devices and would additionally require optical-to-electrical (O/E) and electrical-to-optical (E/O) converters, typically one set for each wavelength used in the WDM.

As a result of the disadvantages described above, ADM capabilities in current WDM systems are often fixed or limited. For example, add/drop connections between low-speed channels and high-speed channels may be fixed when a node is installed and may be changed only by a corresponding change in hardware. As another example, the add/drop functions may be implemented only for a subset of the low-speed channels connected to a node. Alternately, a node may be able to implement only a subset of all possible connections between low-speed channels and high-speed channels. These compromises reduce the overall ADM functionality of the node and its flexibility within a network.

Implementing ADM capabilities for TDM networks also has significant disadvantages. First, as mentioned above, the TDM approach is strongly time-based and requires precise synchronization of the channels entering and exiting the ADM to a common reference clock. As a result, TDM systems require significantly more complex timing recovery, leading to increased overall cost. In addition, since the low-speed channels typically are combined on a bit-by-bit (or byte-by-byte) basis, TDM systems are heavily dependent on the bit rates of the individual low-speed channels and have difficulty handling low-speed channels of different bit rates or different protocols. As yet another disadvantage, TDM systems generally require significant amounts of buffer memory since bits from the low-speed channels typically must be temporarily stored before they can be properly sorted and time-synchronized to form a high-speed channel. These required buffers add to the cost of implementing an ADM within a TDM system.

Thus, there is a need for an inexpensive node which efficiently combines a number of low-speed channels into a high-speed channel and which also provides a broad range of ADM capabilities for optical communications networks, in particular including the functionalities of adding, dropping, drop-and-continue, and pass-through of a low-speed channel. The node preferably implements the ADM functionalities independent of bit rate, format, and protocol of the various channels and is capable of handling a large number of fine granularity low-speed channels. There is further a need for a node which regenerates the channels passing through it.

SUMMARY OF THE INVENTION

In accordance with the present invention, an FDM node for use in optical communications networks includes an O/E converter, a frequency division demultiplexer, an E/O converter, a frequency division multiplexer, and an electrical ADM crosspoint. In the high-speed receive direction, the O/E converter converts a first optical high-speed channel to a first electrical high-speed channel. The frequency division demultiplexer is coupled to the O/E converter and frequency division demultiplexes the first electrical high-speed channel into a first plurality of low-speed channels (preferably at the same data rate as STS-3 signals) which are transmitted to inputs of the ADM crosspoint. In the transmit direction, the frequency division multiplexer receives a second plurality of low-speed channels from outputs of the ADM crosspoint and frequency division multiplexes them into a second electrical high-speed channel, which is then converted by the E/O converter to a second optical high-speed channel. The ADM crosspoint switchably couples its inputs to its outputs, thereby implementing an add/drop multiplexing (ADM) function for the optical high-speed channels.

In another aspect of the invention, the transmit side of an FDM node for use in optical communications networks includes a quadrature amplitude modulation (QAM) modulator, a frequency division multiplexer, and an E/O converter coupled in series. The term QAM is to be interpreted in its most general sense, with multiple signal phases and multiple signal amplitudes. As such, it includes common constellations such as BPSK, QPSK, 8PSK, 16-QAM, 32-Cross, 64-QAM, etc, as well as arbitrary complex constellations. The QAM modulator applies QAM is modulation to the low-speed channels to form FDM channels. The low-speed channels preferably are characterized by data rates greater than 100 million bits per second and forward error correction codes may also be applied. The frequency division multiplexer converts the FDM channels into an electrical high-speed channel, preferably using a two stage IF/RF process. The E/O converter converts the electrical high-speed channel to an optical high-speed channel.

In yet another aspect of the invention, the corresponding receive side includes an O/E converter, a frequency division demultiplexer, and a QAM demodulator coupled in series. The O/E converter converts an optical high-speed channel to an electrical high-speed channel. The frequency division demultiplexer separates the electrical high-speed channel into its constituent FDM channels. The QAM demodulator demodulates the FDM channels into the original low-speed channels.

In another aspect of the invention, a method for transporting data includes the following steps. A first optical high-speed channel is received and converted to a first electrical high-speed channel. This is frequency division demultiplexed into a plurality of first low-speed channels, which are to be passed-through to a second optical high-speed channel. The first low-speed channels are switchably coupled to second low-speed channels. These are frequency division multiplexed to produce a second electrical high-speed channel, which is converted to the second optical high-speed channel.

The FDM-based approach is particularly advantageous because the use of frequency division multiplexing results in the efficient combination of low-speed channels into a high-speed channel and the efficient separation of a high-speed channel into its constituent low-speed channels. For example, since the multiplexing occurs in the electrical domain rather than the optical one, this approach requires only a single optical to electrical conversion (e.g., the optical high-speed channel into an electrical high-speed channel), whereas approaches like WDM would require multiple optical to electrical conversions (e.g., one for each wavelength), with a corresponding increase in the equipment required. Furthermore, since the multiplexing occurs in the frequency domain rather than the time domain, this approach does not have stringent synchronization requirements and does not require memory buffers as would be the case with TDM approaches.

In addition, since the low-speed channels are combined in the frequency domain rather than the time or wavelength domain, this allows more flexibility in the types of low-speed channels which may be supported. For example, the low-speed channels (or the tributaries on which the low-speed channels are based) may be characterized by different data rates or different communications protocols so long as each low-speed channel does not exceed the frequency band allocated to it. As another example, each of the low-speed channels may be amplified or attenuated by different amounts in order to compensate for the specific transmission characteristics at that low-speed channel's frequency band. Frequency bands with especially poor transmission characteristics may simply not be utilized. In contrast, TDM- or WDM-based approaches generally do not have these advantages.

The efficient conversion between optical high-speed channels and electrical low-speed channels also enables the use of an electrical ADM crosspoint to implement the ADM functionality of the FDM node. This yields further advantages since a crosspoint can be more flexible than other ADM solutions. For example, the crosspoint preferably can be configured to connect any input to any output. As a result, in addition to the basic add, drop, and pass-through functions, such a ADM crosspoint can implement any combinations of the above, including broadcasting or multicasting. This flexibility allows a single FDM node to be configured in a variety of ways to support a variety of network configurations. It also allows the FDM node to be easily reconfigured while in service. This facilitates the implementation of system reconfigurations with minimal disturbance to in-service traffic and also facilitates the implementation of fault-tolerance by enabling data streams to be efficiently re-routed to redundant hardware in the case of failure of the primary hardware.

BRIEF DESCRIPTION OF THE DRAWING

The invention has other advantages and features which will be more readily apparent from the following detailed description of the invention and the appended claims, when taken in conjunction with the accompanying drawing, in which:

FIG. 5A is a block diagram of a preferred embodiment of low-speed output converter 270;

FIG. 5B is a block diagram of a preferred embodiment of low-speed input converter 275;

FIG. 7A is a block diagram of a preferred embodiment of demodulator 620;

FIG. 7B is a block diagram of a preferred embodiment of modulator 640;

FIGS. 11 is three frequency diagrams illustrating the reduced bandwidth resulting from use of FDM node 400;

DETAILED DESCRIPTION OF THE PREFERRED EMBODIMENTS

Figure 1C:
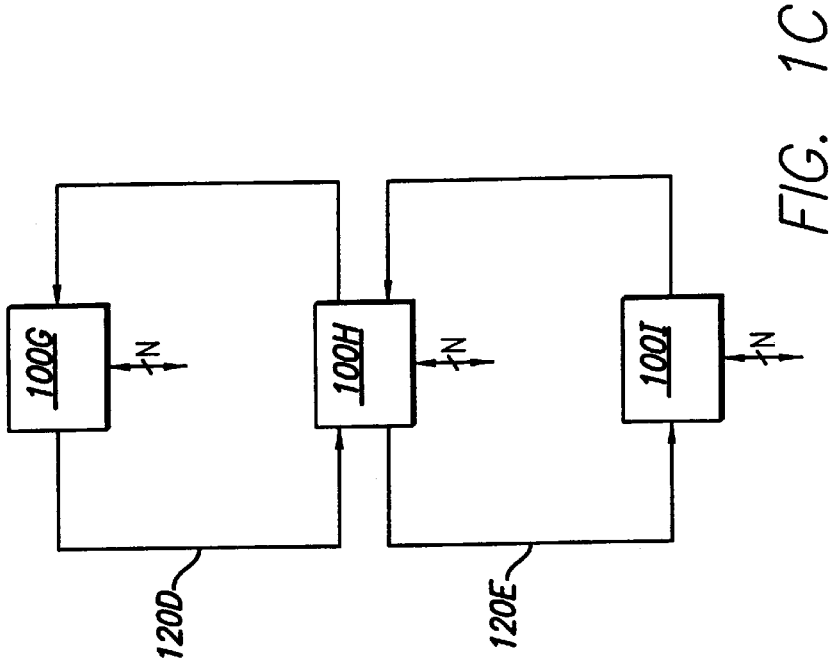
FIGS. 1A–1C are block diagrams of example optical communication networks including the present invention.
Figure 1A:
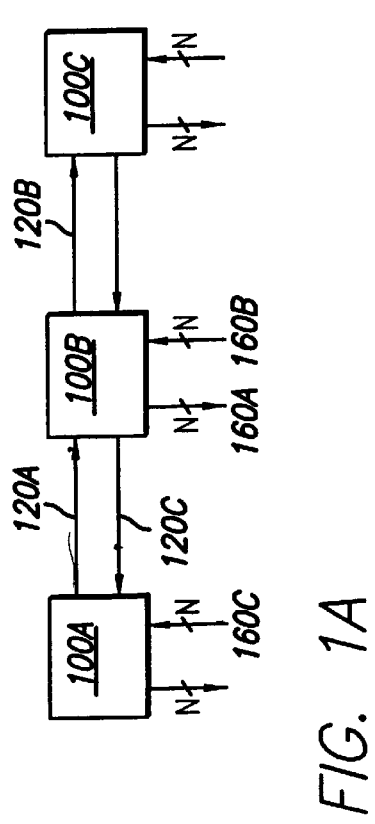
Figure 1B:
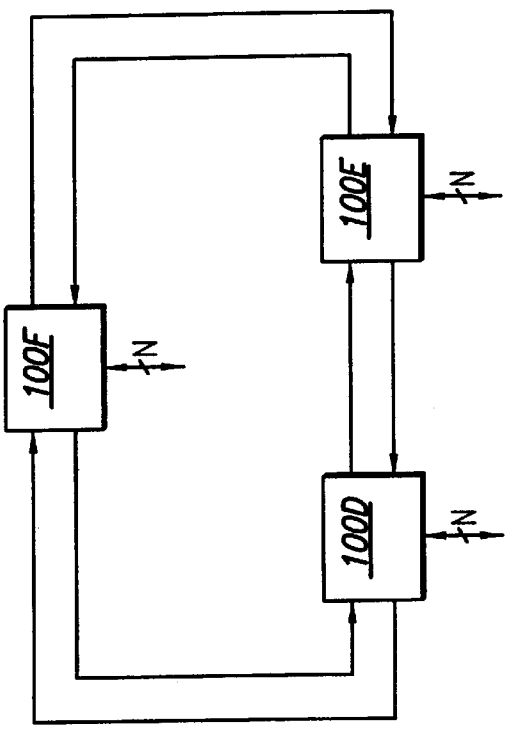

FIGS. 1A–1C are block diagrams of example optical communication networks including the present invention. Each of these networks includes a number of nodes 100A–100I (collectively or generically, nodes 100) which are coupled to each other by optical fibers (not shown) in various configurations. The nodes 100 transmit optical high speed data signals to each other over the optical fibers. The signals shall be referred to as high-speed channels 120 and are depicted by the arrows entering and exiting the sides of each node 100. Current optical fibers have two spectral regions which are commonly used for communications: the 1.3 and 1.55 micron regions. At a wavelength of 1.3 micron, transmission of the optical signal is primarily limited by attenuation in the fiber; dispersion is less of a factor. Conversely, at a wavelength of 1.55 micron, the optical signal will experience more dispersion but less attenuation. Hence, the optical signal preferably has a wavelength either in the 1.3 micron region or the 1.55 micron region and, for long distance communications systems, the 1.55 micron region is generally preferred.

Each node 100 also receives and transmits multiple lower speed data signals to other devices (not shown) via any number of communications channels, including for example branch fibers, metal conductors, and wireless channels. For convenience, these lower speed data signals shall be referred to as tributaries 160 and are represented by the slashed arrows entering and exiting the bottom of each node 100, the slash and "N" indicating the presence of multiple signals. In addition to transmitting high-speed channels 120 to other nodes, each node 100 also implements some add-drop multiplexing (ADM) functionality to allow the addition of incoming tributaries 160B to outgoing high-speed channels 120 and to allow the extraction of tributaries 160A from incoming high-speed channels 120. It is impractical to describe all possible ADM functionalities, but the following examples will describe the more basic functionalities.

In FIG. 1A, node 100A is coupled to node 100B to node 100C to form a bidirectional linear chain, bidirectional meaning that there are high-speed channels 120 running in both directions along the chain. Node 100B receives incoming high-speed channel 120A from node 100A. This channel 120A is the combination of a number of tributaries, some of which may have node 100B as their final destination. These tributaries are extracted, or "dropped," from high-speed channel 120A and exit node 100B via the outgoing tributaries. The remaining tributaries in high-speed channel 120A presumably are destined for node 100C and, therefore, are "passed through" node 100B to form part of high-speed channel 120B traveling to node 100C. Some of the incoming tributaries 160B may also be destined for node 100C. These are "added" by node 100B to high-speed channel 120B. This example illustrates the basic ADM functions of add, drop, and pass-through.

More complex ADM functions include broadcast, multicast, and drop-and-continue. As an example of multicast, one of the tributaries 160B may be destined for multiple destinations including both nodes 100A and 100C. To implement the multicast function, the incoming tributary 160B would be added to both the high-speed channel 120B traveling to node 100C and to the high-speed channel 120C traveling to node 100A. As another example, if the tributary 160B were destined for node 100C and also for additional nodes beyond 100C, the tributary 160B may be added multiple times to high-speed channel 120B with one tributary dropped at each destination node. In the broadcast situation, a single incoming low-speed channel is dropped to multiple tributaries. For example, node 100B may drop an incoming low-speed channel on an incoming high-speed channel 120A to several of the tributaries 160A. In drop-and-continue, a low-speed channel on an incoming high-speed channel is both dropped and passed through. For example, if one of the incoming tributaries 160C were destined for both nodes 100B and 100C, node 100A would first add that tributary 160C to the high-speed channel 120A. Node 120B would drop the corresponding low-speed channel from high-speed channel 120A to tributary 160A but would also pass the low-speed channel through to high-speed channel 120B destined for node 100C, thus implementing a drop-and-continue.

The above functions are merely examples of ADM functionality which may be implemented by nodes 100. In general, it is desirable for nodes 100 to be able to route any incoming data signal(s), whether received from an incoming tributary 160 or as part of an incoming high-speed channel 120, to any outgoing data signal(s), whether transmitted as an outgoing tributary 160 or as part of an outgoing high-speed channel 120. It is also desirable for nodes 100 to be able to simultaneously accommodate data signal(s) of various data rates and protocols and/or to be easily reconfigured to accommodate various data rates and protocols. These properties add to the flexibility of nodes 100, allowing them to be used for more types of network configurations and applications.

FIG. 1B is an example of a ring network using nodes 100D–100F. These nodes 100 are coupled by two high-speed channels, one forming a clockwise ring and the other forming a counterclockwise ring, for example for redundancy purposes. To continuously take advantage of this redundancy, tributaries entering the high-speed ring may be broadcast in both directions around the ring. Alternately, one ring may be used as the primary direction while the other is reserved strictly for failure of the primary ring. In this case, when failure of the primary ring is detected, all traffic is re-routed to the redundant ring. As a variant of this, traffic may be intentionally re-routed to the redundant ring to allow, for example, an additional node to be added to the primary ring. After the installation, traffic is returned to the primary ring. All of these situations require that the nodes 100 be able to implement certain ADM functionalities.

Other network configurations will be apparent. For example, if the linear chain only contained two nodes 100, it typically would be referred to as a point-to-point connection rather than a linear chain. FIG. 1C is an example of a ring-to-ring configuration. Nodes 100G and 100H are coupled to form one ring; while nodes 100H and 100I are coupled to form another ring. Node 100H, through its ADM functionality, couples the two rings together since, for example, a low-speed channel received as part of high-speed channel 120D may be passed through to high-speed channel 120E.

Figure 2:
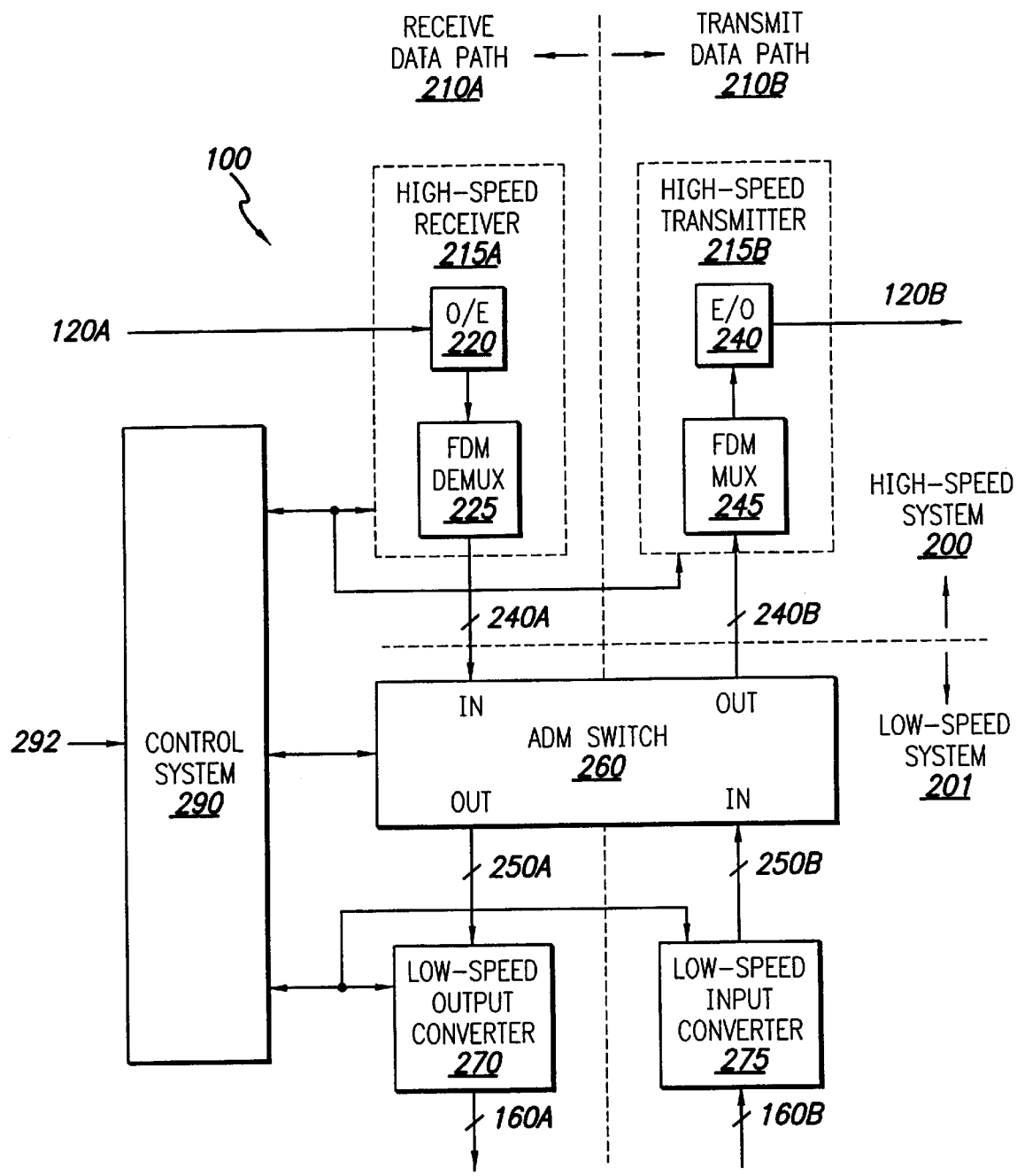
FIG. 2 is a block diagram of an FDM node 100 in accordance with the present invention.

FIG. 2 is a block diagram of a node 100 in accordance with the present invention. For reasons which shall become apparent, node 100 shall be referred to as an FDM node 100. For convenience, FDM node 100 may be divided into a "receive" data path 210A, a "transmit" data path 210B, and a control system 290. As used herein, the terms "receive" and "transmit" are with respect to the high-speed channels 120. In other words, "receive" refers to the data direction from an incoming high-speed channel 120A to an outgoing tributary 160A (i.e., the direction for receiving a high-speed channel); while "transmit" refers to the data direction from an incoming tributary 160B to an outgoing high-speed channel 120B. In general, the suffixes A and B will be used to denote the receive and transmit directions, respectively, for data signals and input/output ports.

The division of FDM node 100 into receive and transmit data paths 210 is primarily for convenience of describing the functionality of FDM node 100 and does not imply that the implementation of FDM node 100 must be physically segregated. In fact, it may often be preferable to implement corresponding portions of the two data paths 210 together in a single device. For example, an optical transmitter for the transmit data path 210B may often be combined with an optical receiver for the receive data path 210A into a single component typically referred to as a transceiver. Other examples will be apparent. In addition, the term "data path" is used here to conveniently describe FDM node 100 and does not imply that these are the only paths along which data signals may propagate. For example, in the pass-through situation, data will be received on incoming high-speed channel 120A, routed along a portion of the receive data path 210A and then a portion of the transmit data path 210B, and exit as part of outgoing high-speed channel 120B.

The receive data path 210A includes an optical-to-electrical (O/E) converter 220, a frequency division demultiplexer 225, an ADM switch 260, and optionally also a low-speed output converter 270 coupled in series from the incoming high-speed channel 120A to the outgoing tributaries 160A. The O/E converter 220, preferably a detector such as a high-speed PIN diode, converts an incoming signal from optical to electrical form. The frequency division demultiplexer 225 frequency division demultiplexes an incoming signal into a plurality of signals 240A, which shall be referred to as low-speed channels. The ADM switch 260 implements the ADM functionality of node 100. It preferably is a crosspoint switch and therefore shall be referred to as an ADM crosspoint 260, although other types of switches such as packet switches may be used. The ADM crosspoint 260 couples its inputs to its outputs and may be dynamically reconfigured to implement any of a number of couplings between its inputs and outputs. In other words, the ADM crosspoint 260 switchably couples its inputs to its outputs. The crosspoint 260 preferably is non-blocking and capable of coupling any of its inputs to any of its outputs, including to multiple outputs simultaneously. If necessary, low-speed output converter 270 converts between the format from ADM crosspoint 260 (i.e., low-speed channesl 250A) and tributaries 160A.

The transmit data path 210B is a mirror image of the receive data path 210A. From incoming tributaries 160B to outgoing high-speed channel 120B, the transmit data path 210B includes a low-speed converter 275 for converting from tributaries 160B to low-speed channels 250B, the ADM crosspoint 260 (which is also a part of the receive data path 210A), a frequency division multiplexer 245 for frequency division multiplexing a plurality of signals into a single signal, and an E/O converter 240 for converting signals from electrical to optical form. The E/O converter 240 preferably includes an optical source, such as a laser, and an optical modulator, such as a Mach Zender modulator, which modulates the optical carrier produced by the optical source with an incoming electrical signal.

Control system 290 is coupled to both data paths 210 and generates the controls for node 100. Control system 290 also has an external port 292 to allow external control of node 100. For example, an external network management system may manage a large fiber network, including node 100. Alternately, a technician may connect a craft terminal to external port 292 to allow local control of node 100, as may be desirable during troubleshooting.

For convenience, data paths 210 may be divided into a high-speed system 200 and a low-speed system 201. The high-speed system 200includes those portions of data paths 210 which lie between the high-speed channels 120 and the low-speed channels 240; while the low-speed system 201 includes those portions between the low-speed channels 240 and the tributaries 160. The high-speed system portion 200 of the receive data path 210A shall be referred to as the high-speed receiver 215A; while the high-speed system portion 200 of the transmit data path 210B shall be referred to as the high-speed transmitter 215B.

Figure 3:
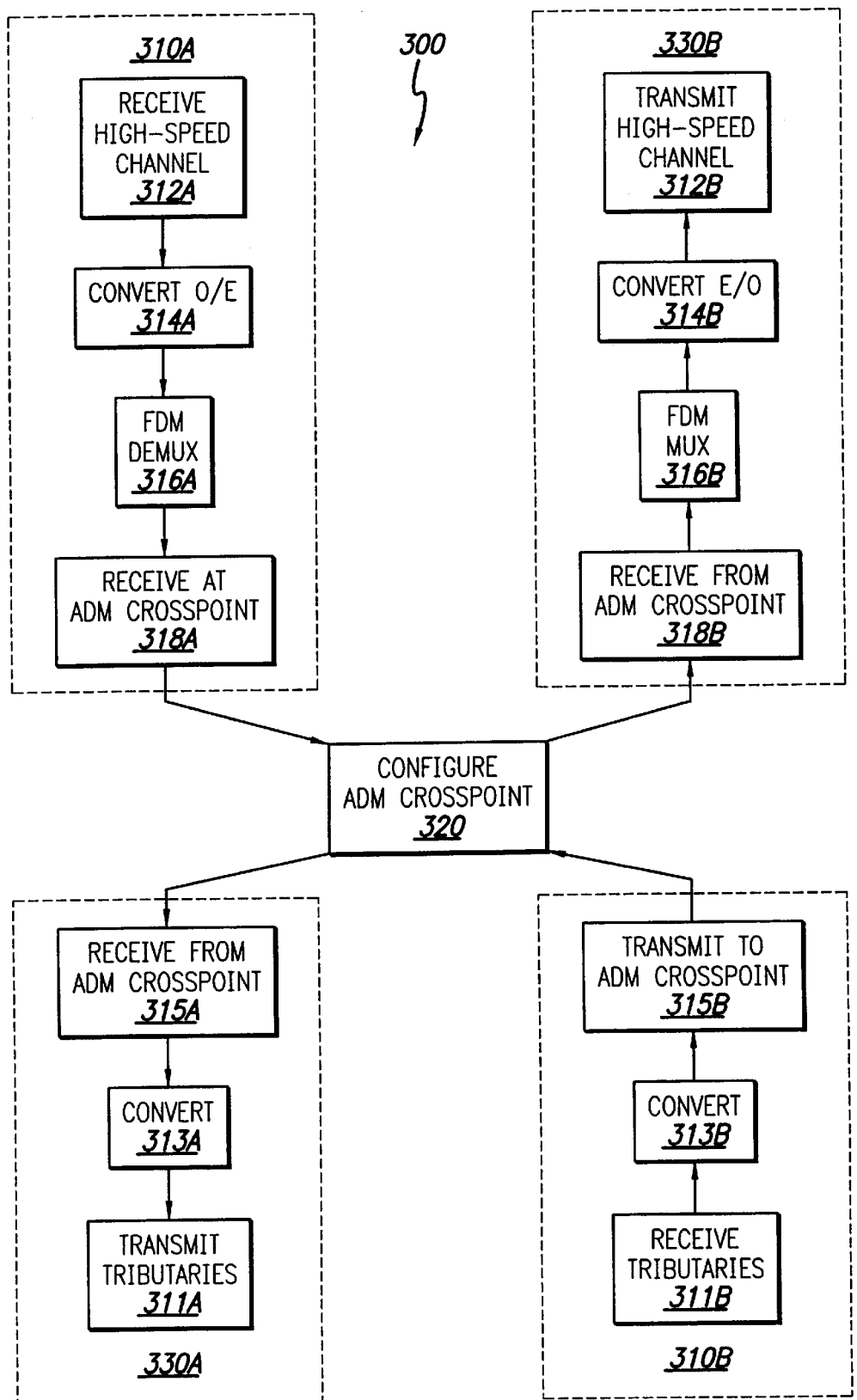
FIG. 3 is a composite flow diagram illustrating operation of FDM node 100 implementing add, drop, and pass-through functions.

FIG. 3 is a composite flow diagram illustrating add, drop, and pass-through functions 300 using FDM node 100. As mentioned previously, FDM node 100 can implement many different ADM functionalities, only a representative sampling of which will be explained for reasons of conciseness. The invention is not limited to these examples.

Method 300 has three basic steps: 310, 320 and 330. The ADM crosspoint 260 receives 310 a low speed channel originating either from a high-speed channel 120A (branch 310A) or from a tributary 160B (branch 310B). The control system 290 configures 320 the ADM crosspoint 260 to route the incoming low-speed channel to the appropriate output. From this output, the low-speed channel is transmitted 330 on its way, either as part of an outgoing high-speed channel 120B (branch 330B) or an outgoing tributary 160A (branch 330A). Now consider each of the receive 310 and transmit 330 steps in turn.

Step 330B is performed by the high-speed transmitter 215B. Low-speed channels 240B from the ADM crosspoint 260 are received 318B by the high-speed transmitter 215B. The frequency division multiplexer 245 combines these channels into a high-speed channel using frequency division multiplexing 316B techniques. Typically, each low-speed channel 240B is modulated on a carrier frequency distinct from all other carrier frequencies. These modulated carriers are then combined to form a single electrical high-speed channel, typically an RF signal. E/O converter 240 converts 314B the electrical high-speed channel to optical form, preferably via an optical modulator which modulates an optical carrier with the electrical high-speed channel. The optical high-speed channel 120B is transmitted 312B to the next node.

Step 310A is the reverse of step 330B and is performed by the high-speed receiver 215A. An incoming optical high-speed channel 120A, such as that produced in step 330B, is received 312A by the high-speed receiver 215A. O/E converter 220 converts 314A the optical high-speed channel 120A to an electrical high-speed channel, typically an RF signal. This electrical high-speed channel includes a number of low-speed channels which were combined by frequency division multiplexing. Frequency division demultiplexer 225 frequency division demultiplexes 316A the high-speed signal to recover the plurality of low-speed channels 240A, which are received 318A by crosspoint 260.

Steps 310B and 330A are relatively simpler. In step 310B, the low-speed input converter 275 receives 311B incoming tributaries 160B and converts 313B them into low-speed channels 250B, assuming that a conversion is necessary. The low-speed channels 250B are received 315B by the ADM crosspoint 260. In step 330A, low-speed channels 250A are received 315A by the low-speed output converter 270 from the ADM crosspoint. The low-speed output converter 270 converts 313A the low-speed channels 250A into tributaries 160A, which are transmitted 311A to their local destinations. If no conversion between low-speed channels 250 and tributaries 160 is required, then ADM crosspoint 260 may directly receive and transmit the tributaries 160/low-speed channels 250.

In step 320, the control system 290 configures the ADM crosspoint 260 according to the desired functionality. For example, to implement the add functionality, a tributary 160B is received according to step 310B, the crosspoint 260 is configured 320 to couple the relevant incoming low-speed channel 250B to the relevant outgoing low-speed channel 240B, and the low-speed channel 240B is output as part of high-speed channel 120B according to step 330B. For the drop functionality, steps 310A and 330A are the relevant input and output steps, and the crosspoint 260 is configured 320 to couple the relevant incoming low-speed channel 240A to the relevant outgoing low-speed channel 250A. For pass-through functionality, data is received according to step 310A, the crosspoint 260 is configured 320 to couple the relevant incoming low-speed channel 240A to the relevant outgoing low-speed channel 240B, and the data is transmitted according to step 330B. The more complex add-drop functionalities, such as multicast, broadcast and drop-and-continue, may be implemented by appropriately configuring 320 the ADM crosspoint 260.

The use of frequency division multiplexing in the high-speed system 200 allows the transport of a large number of low-speed tributaries 160 over a single fiber in a spectrally-efficient manner. It also reduces the cost of high-speed system 200 since the bulk of the processing performed by high-speed system 200 is performed on low-speed electrical signals. In contrast, the relatively spectrally-inefficient modulation schemes used by WDM and TDM systems necessitate the use of larger bandwidths, which leads to larger dispersion and non-linear effects and the use of higher-speed electronics, which typically leads to higher costs.

Furthermore, since the high-speed channels 120 can efficiently and cost effectively be converted to low-speed channels 240, the add/drop functionality can be implemented electrically and, in particular, the use of crosspoint 260 allows the implementation of a broad range of add/drop functionality, including functions such as multicasting, broadcasting, and drop-and-continue. This, in turn, leads to a flexible node 100 which may be used in many different network configurations and which facilitates the implementation of system redundancies and the servicing of nodes 100 with minimal disturbance to in-service traffic. Furthermore, since the crosspoint 260 is preferably completely non-blocking and flow-through, data need not be timed nor stored. As a result, the same ADM crosspoint 260 may be used for a wide variety of bit rates, data formats, and protocols.

Figure 4:
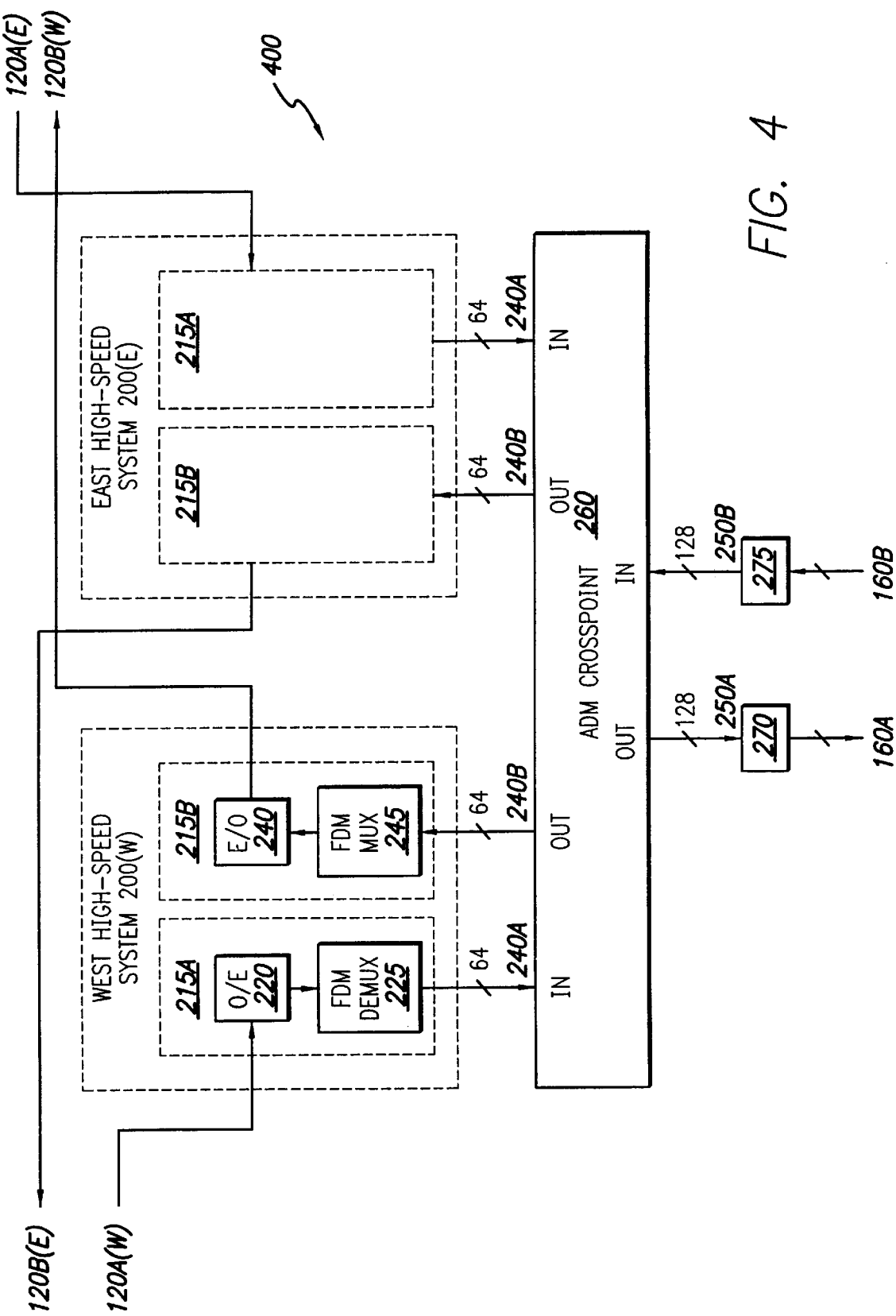
FIG. 4 is a block diagram of a preferred embodiment 400 of FDM node 100.

FIG. 4 is a block diagram of a preferred embodiment 400 of FDM node 100. FDM node 400 includes two high-speed systems 200(E) and 200(W), a low-speed system 201, and a control system 290 (not shown in FIG. 4). The high-speed systems 200 are the same as each other, but two systems are used in order to facilitate flow to two other nodes (not shown) which are arbitrarily referred to as an east and a west node. This is a common configuration, as shown in FIGS. 1A–1C. The suffixes E and W denote high-speed channels arriving from the east and west nodes, respectively. In the eastbound direction, high-speed system 200(E) has incoming and outgoing high-speed channels 120A(E) and 120B(E) and is coupled to low-speed system 201 in the same manner as in FDM node 100. West high-speed system 200(W) is analogously coupled. Other embodiments may have different numbers of high-speed systems 200 and/or low-speed systems 250 or could include only the high-speed receiver 215A or the high-speed transmitter 215B, rather than both as shown in FDM node 100. Alternately, multiple high-speed channels 120 could be coupled to a single high-speed system 200. For example, rather than having separate high-speed systems 200 to facilitate high-speed channels 120 coming from different nodes, a single high-speed system 200 could be used to receive both high-speed channels 120A and to transmit both high-speed channels 120B.

Each of the four high-speed channels 120 in node 400 preferably carries 10 billion bits per second (Gbps), which is equivalent in data capacity to an OC-192 data stream. Each low-speed channel 240,250 preferably is an electrical signal which has a data rate of 155 million bits per second (Mbps) and is similar to an STS-3 signal. This allows 64 low-speed channels 240,250 to be included in each high-speed channel 120. There are 64 low-speed channels 240 running in each direction between each high-speed system 200 and ADM crosspoint 260, and there are 128 low-speed channels 250 running between ADM crosspoint 260 and each of the low-speed converters 270,275, as indicated by the number located adjacent to the slashed lines 240,250. The tributaries 160 are preferably some combination of OC-3, OC-12, and OC-48 signals (or their electrical counterparts STS-3, STS-12, STS-48) and the total capacity of the incoming and outgoing tributaries 160B and 160A is equivalent to the capacity of the corresponding low-speed channels 250B and 250A, respectively. Hence, FDM node 100A has enough capacity to place every incoming tributary 160B onto an outgoing high-speed channel 120B and also has enough capacity to drop incoming high-speed channels 120A in their entirety to outgoing tributaries 160A.

FIGS. 5–9 are more detailed block diagrams illustrating various portions of FDM node 400. Each of these figures includes a part A and a part B, which correspond to the receive data path 210A and transmit data path 210B, respectively. These figures will be explained by working along the transmit data path 210B from the incoming tributaries 160B to the outgoing high-speed channel 120B, first describing the component in the transmit data path 120B (i.e., part B of each figure) and then describing the corresponding components in the receive data path 120A (i.e., part A of each figure).

FIGS. 5A–5B are block diagrams of one type of low-speed converter 270,275. In the transmit direction, low-speed input converter 275 converts the tributaries 160B to low-speed channels 250B, which have the same data rate as STS-3 signals in this embodiment. The structure of converter 275 depends on the format of the incoming tributary 160B. For example, if tributary 160B is an STS-3 signal then no conversion is required. If it is an OC-3 signal, then converter 275 will perform an optical to electrical conversion.

FIG. 5B is a converter 275 for an OC-12 tributary. Converter 275 includes an O/E converter 510, CDR 512, TDM demultiplexer 514, and parallel to serial converter 516 coupled in series. The O/E converter 510 converts the incoming OC-12 tributary 160B from optical to electrical form, producing the corresponding STS-12 signal. CDR 512 performs clock and data recovery of the STS-12 signal and also determines framing for the signal. CDR 512 also converts the incoming bit stream into a byte stream. The output of CDR 512 is byte-wide, as indicated by the "×8." Demultiplexer 514 receives the signal from CDR 512 one byte at a time and byte demultiplexes the recovered STS-12 signal using time division demultiplexing (TDM) techniques. The result is four separate byte-wide signals, as indicated by the "4×8," each of which is equivalent in data rate to an STS-3 signal. Parallel to serial converter 516 adds framing to these four signals so that the signals behave similarly to STS-3 signals in FDM node 400. Converter 516 also converts each byte-wide signal into a serial signal at eight times the data rate, with the resulting output being four low-speed channels 250B, each at a data rate of 155 Mbps.

Low-speed input converter 270 of FIG. 5A implements the reverse functionality of converter 275, converting four 155 Mbps low-speed channels 250A into a single outgoing OC-12 tributary 160A. In particular, converter 270 includes CDR 528, FIFO 526, TDM multiplexer 524, parallel to serial converter 522, and E/O converter 520 coupled in series. CDR 512 performs clock and data recovery of each of the four incoming low-speed channels 250A, determines framing for the channels, and converts the channels from serial to byte-wide parallel. The result is four byte-wide signals entering FIFO 526. FIFO 526 is a buffer which is used to synchronize the four signals in preparation for combining them into a single STS-12 signal. Multiplexer 524 performs the actual combination using TDM, on a byte level, to produce a single byte-wide signal equivalent in data capacity to an STS-12 signal. Parallel to serial converter 522 adds STS-12 framing to complete the STS-12 signal and converts the signal from byte-wide parallel to serial. E/O converter converts the STS-12 signal to electrical form, producing the outgoing OC-12 tributary 160A.

Converters 270 and 275 have been described in the context of OC-3 and OC-12 tributaries and low-speed channels with the same date rate as STS-3 signals, but the invention is not limited to these protocols. Alternate embodiments can vary the number, bit rate, format, and protocol of some or all of these tributaries 160. One advantage of FDM node 100 is that the system architecture is generally independent of these parameters. For example, the tributaries 160 can comprise eight 2.5 Gbps data streams, 32 622 Mbps data streams, 128 155 Mbps data streams, 384 51.84 Mbps data streams, or any other bit rate or combinations of bit rates, without requiring major changes to the architecture of FDM node 100.

In one embodiment, the tributaries 160 are at data rates which are not multiples of the STS-3 data rate. In one variant, low-speed input converter 275 demultiplexes the incoming tributary 160B into some number of parallel data streams and then stuffs null data into each resulting stream such that each stream has an STS-3 data rate. For example, if tributary 160B has a data rate of 300 Mbps, converter 275 may demultiplex the tributary into four 75 Mbps streams. Each stream is then stuffed with null data to give four 155 Mbps low-speed channels. In another variant, the speed of the rest of FDM node 400 (specifically the modulator 640 and demodulator 645 of FIG. 6) may be adjusted to match that of the tributary 160. Low-speed output converter 270 typically will reverse the functionality of low-speed input converter 275.

Figure 6A:
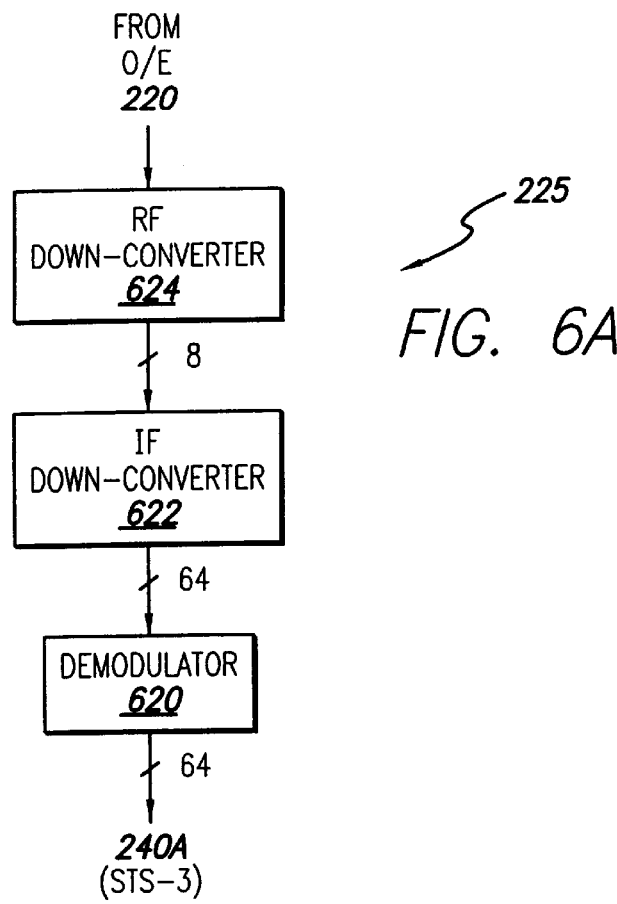
FIG. 6A is a block diagram of a preferred embodiment of FDM demultiplexer 225.
Figure 6B:
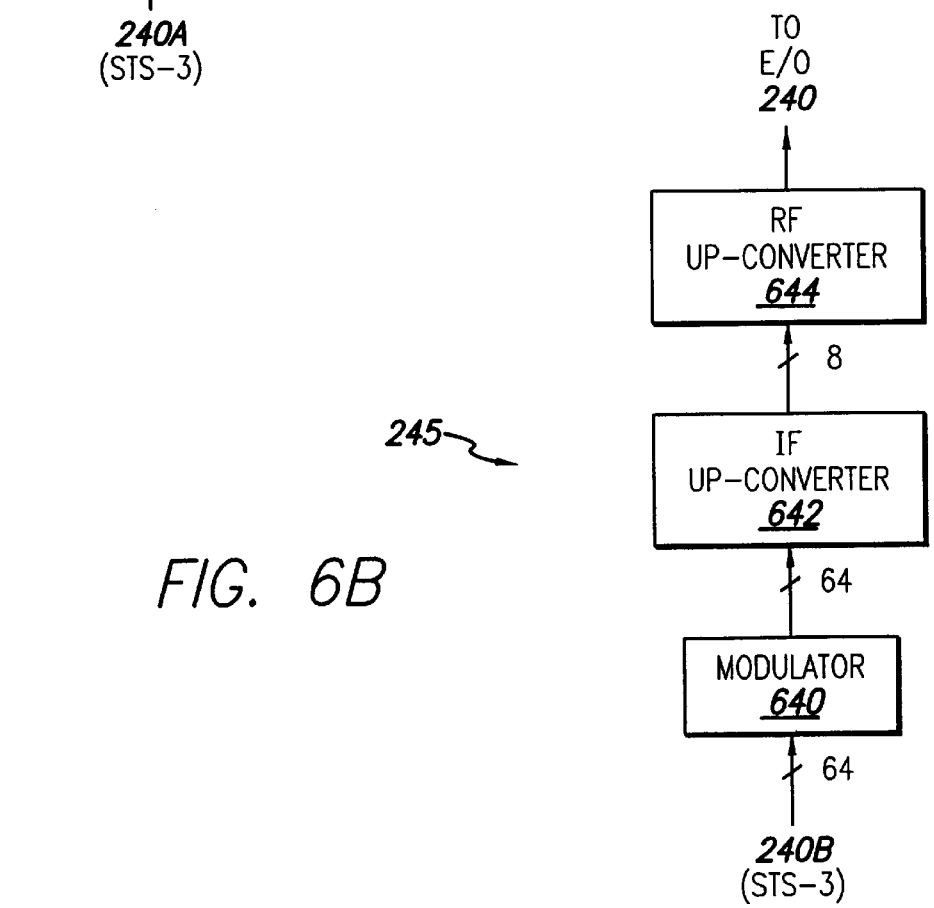
FIG. 6B is a block diagram of a preferred embodiment of FDM multiplexer 245.

Moving further along transmit data path 210B, the low-speed channels 250B produced by low-speed input converter 275 are received by ADM crosspoint 260, the operation of which was described in conjunction with FIG. 3. ADM crosspoint 260 outputs low-speed channels 240B to FDM multiplexer 245 for conversion to an electrical high-speed channel. FIGS. 6B–9B are block diagrams of a preferred embodiment of FDM multiplexer 245. Referring first to FIG. 6B, FDM multiplexer 245 includes a modulator 640, IF up-converter 642, and RF up-converter 644 coupled in series. FIGS. 7B–9B show further details of each of these respective components. Similarly, the corresponding FDM demultiplexer 225 is shown in FIG. 6A and includes an RF down-converter 624, IF down-converter 622, and demodulator 620 coupled in series, with FIGS. 7A–9A showing the corresponding details.

Referring to FIG. 7B, modulator 640 modulates the 64 incoming low-speed channels 240B to produced 64 QAM-modulated channels which are input to the IF up-converter 642. For convenience, the QAM-modulated channels shall be referred to as IF channels because they are inputs to the IF up-converter 642. In this embodiment, each low-speed channel 240 is modulated separately to produce a single IF channel and FIG. 7B depicts the portion of modulator 640 which modulates one IF channel. Modulator 640 in its entirety would includes 64 of the portions shown in FIG. 7B. For convenience, the single channel shown in FIG. 7B shall also be referred to as a modulator 640. Modulator 640 includes a Reed-Solomon encoder 702, an interleaver 704, a trellis encoder 706, a digital filter 708 and a D/A converter 710 coupled in series. Modulator 640 also includes a synchronizer 712 coupled between the incoming low-speed channel 240B and the filter 708.

Modulator 640 operates as follows. Reed-Solomon encoder 702 encodes the incoming low-speed channel 240B according to a Reed-Solomon code. Programmable Reed-Solomon codes are preferred for maintaining very low BER (typ. $10^{-12}$) with low overhead (typ. less than 20%). This is particularly relevant for optical fiber systems because they generally requires low bit error rates (BER) and any slight increase of the interference or noise level will cause the BER to exceed the acceptable threshold. For example, a Reed-Solomon code of (204,188) can be applied for an error correction capability of 8 error bytes per every 204 encoded bytes.

The interleaver 704 interleaves the digital data string output by the Reed-Solomon encoder 702. The interleaving results in more robust error recovery due to the nature of trellis encoder 706. Specifically, forward error correction (FEC) codes are able to correct only a limited number of mistakes in a given block of data, but convolutional encoders such as trellis encoder 706 tend to cluster errors together. Hence, without interleaving, a block of data which contained a large cluster of errors would be difficult to recover. However, with interleaving, the cluster of errors is distributed over several blocks of data, each of which may be recovered by the FEC code. Convolution interleaving of depth 10 is preferred.

The trellis encoder 706 applies a QAM modulation, preferably 16 state QAM modulation, to the digital data stream output by the interleaver 704. The result typically is a complex baseband signal, representing the in-phase and quadrature (I and Q) components of a QAM-modulated signal. Trellis encoder 706 implements the QAM modulation digitally and the resulting QAM modulated signal is digitally filtered by filter 708 in order to reduce unwanted sidelobes and then converted to the analog domain by D/A converter 710. Synchronizer 712 performs clock recovery on the incoming low-speed channel 240B in order to synchronize the digital filter 708. The resulting IF channel is a pair of differential signals, representing the I and Q components of the QAM-modulated signal. In alternate embodiments, the QAM modulation may be implemented using analog techniques.

Referring to FIG. 7A, demodulator 620 reverses the functionality of modulator 640, recovering a low-speed channel 240A from an incoming IF channel (i.e., analog I and Q components in this embodiment) received from the IF down-converter 622. Demodulator 620 includes an A/D converter 720, digital Nyquist filter 722, equalizer 724, trellis decoder 726, deinterleaver 728, Reed-Solomon decoder 730 and FIFO 732 coupled in series. Demodulator 620 further includes a synchronizer 734 which forms a loop with Nyquist filter 722 and a rate converter phase-locked loop (PLL) 736 which is coupled between synchronizer 734 and FIFO to 732.

Demodulator 620 operates as FIG. 7 would suggest. The A/D converter 720 converts the incoming IF channel to digital form and Nyquist filter 722, synchronized by synchronizer 734, digitally filters the result to reduce unwanted artifacts from the conversion. Equalizer 724 applies equalization to the filtered result, for example to compensate for distortions introduced by propagation across the fiber. Trellis decoder 726 converts the I and Q complex signals to a digital stream and deinterleaver 728 reverses the interleaving process. Reed-Solomon decoder 730 reverses the Reed-Solomon encoding, correcting any errors which have occurred. If the code rate used results in a data rate which does not match the rate used by the low-speed channels, FIFO 732 and rate converter PLL 736 transform this rate to the proper data rate.

One advantage to placing modulator 640 and demodulator 620 on the high-speed channel side of ADM crosspoint 620 is that FDM node 400 performs full 3R regeneration (i.e., reamplification, retiming, and reshaping) on signals which are passed-through the node. Channels passing through FDM node 400 propagate from the incoming high-speed channel 120A down the receive data path 210A (including through demodulator 620), are switched by ADM crosspoint 260 to the transmit data path 210B, and then propagate up the transmit data path 210B (including through modulator 640) to the outgoing high-speed channel 120B. These pass-through channels are demodulated by demodulator 620 into low-speed channels, which are then re-modulated by modulator 640 for re-transmission on outgoing high-speed channel 120B. This demodulation/remodulation, which occurs at each FDM node 400, retimes and reshapes the pass-through channels. Reamplification occurs throughout the data path. Full 3R regeneration allows many system parameters (e.g., jitter budgets) to be based on the communications link from one node to the next node, rather than the complete link from the originating node to the final destination node which may encompass multiple node-to-node links.

Referring again to the transmit data path 210B, IF up-converter 642 receives the 64 IF channels from modulator 640. Together, IF up-converter 642 and RF up-converter 644 combine these 64 IF channels into a single RF signal using FDM techniques. In essence, each of the IF channels (or equivalently, each of the 64 low-speed channels 240B) is allocated a different frequency band within the RF signal. The allocation of frequency bands shall be referred to as the frequency mapping, and, in this embodiment, the IF channels may also be referred to as FDM channels since they are the channels which are FDM multiplexed together. The multiplexing is accomplished in two stages. IF up-converter 642 first combines the 64 IF channels into 8 RF channels, so termed because they are inputs to the RF up-converter 644. In general, the terms "IF" and "RF" are used throughout as labels rather than, for example, indicating some specific frequency range. RF up-converter 644 them combines the 8 RF channels into the single RF signal, also referred to as the electrical high-speed channel.

Figure 8A:
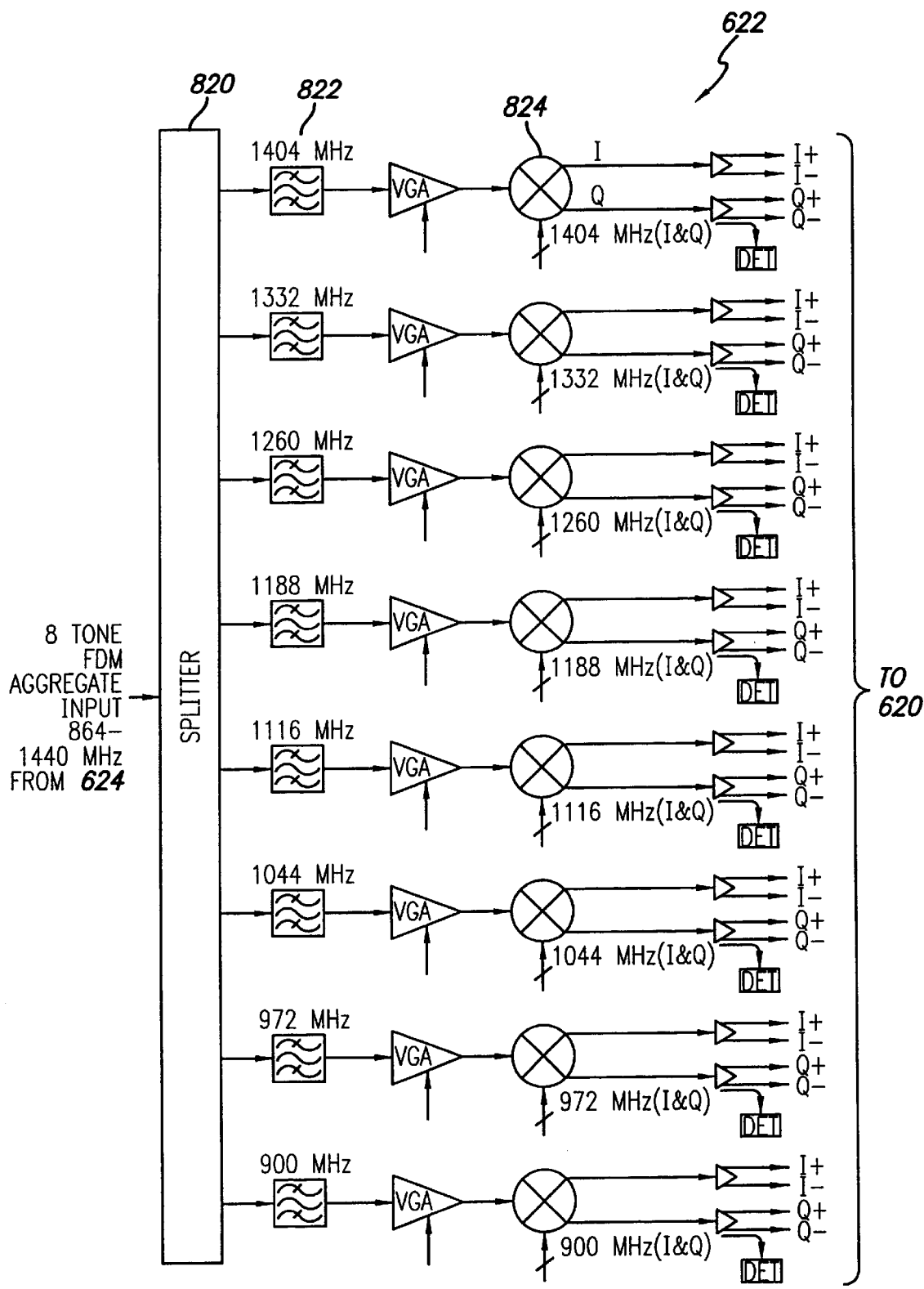
FIG. 8A is a block diagram of a preferred embodiment of IF downconverter 622.
Figure 8B:
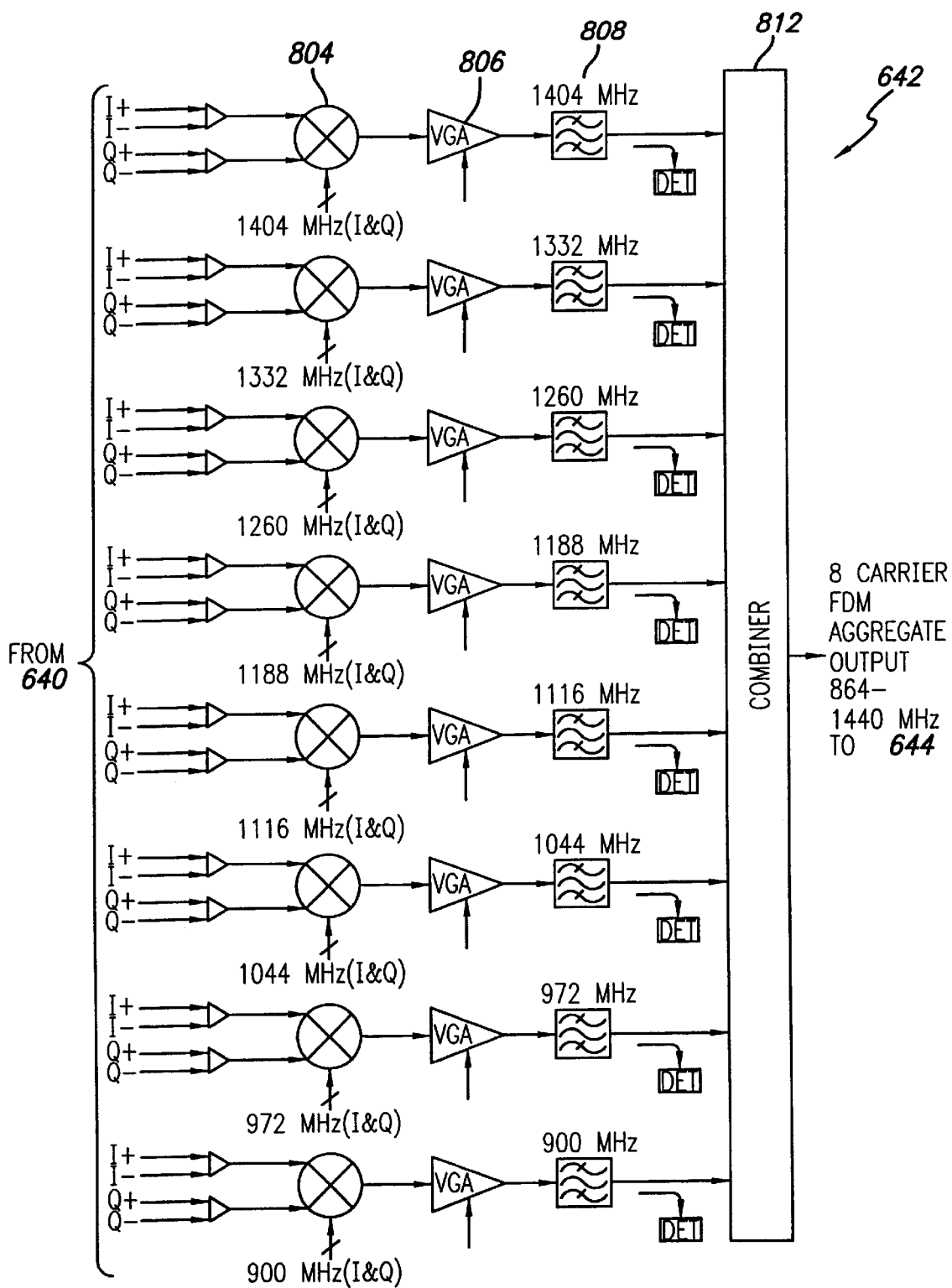
FIG. 8B is a block diagram of a preferred embodiment of IF upconverter 642.

Referring to FIG. 8B, IF up-converter 642 includes eight stages (identical in this embodiment, but not necessarily so), each of which combines 8 IF channels into a single RF channel. FIG. 8B depicts one of these stages, which for convenience shall be referred to as an IF up-converter 642. IF up-converter 642 includes eight frequency shifters and a combiner 812. Each frequency shifter includes a modulator 804, a variable gain block 806, and a filter 808 coupled in series to an input of the combiner 812.

IF up-converter 642 operate as follows. Modulator 804 receives the IF channel and also receives a carrier at a specific IF frequency (e.g., 1404 MHz for the top frequency shifter in FIG. 8B). Modulator 804 modulates the carrier by the IF channel. The modulated carrier is adjusted in amplitude by variable gain block 806 and bandpass filtered by filter 808. The result is a QAM-modulated IF signal at a specific frequency. However, each frequency shifter uses a different frequency (e.g., ranging in equal increments from 900 MHz to 1404 MHz in this example) so combiner 812 simply combines the 8 incoming QAM-modulated signal to produce a single signal (i.e., the RF channel) containing the information of all 8 incoming IF channels. In this example, the resulting RF channel covers the frequency range of 864–1440 MHz.

Figure 9A:
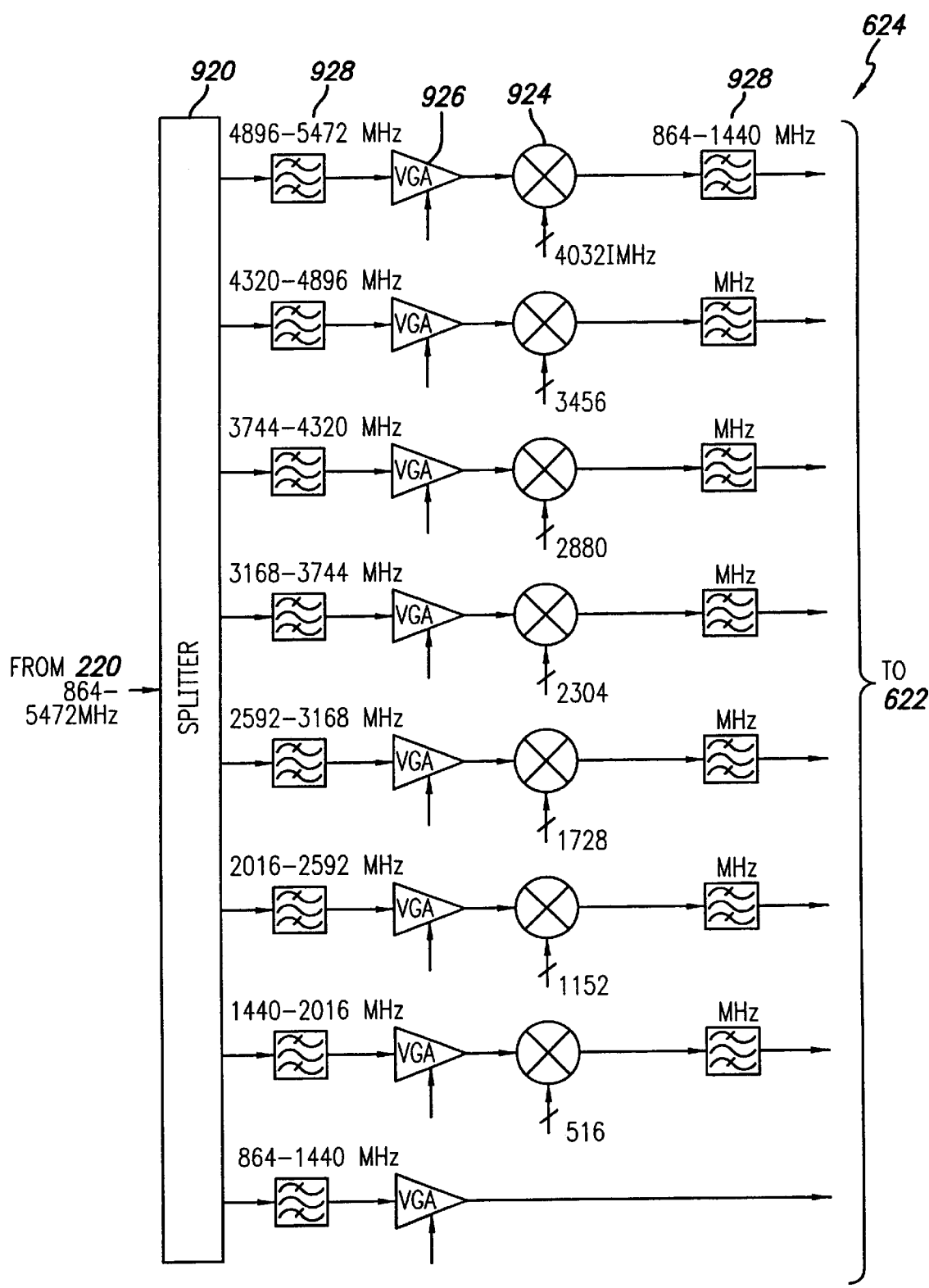
FIG. 9A is a block diagram of a preferred embodiment of RF downconverter 624.
Figure 9B:
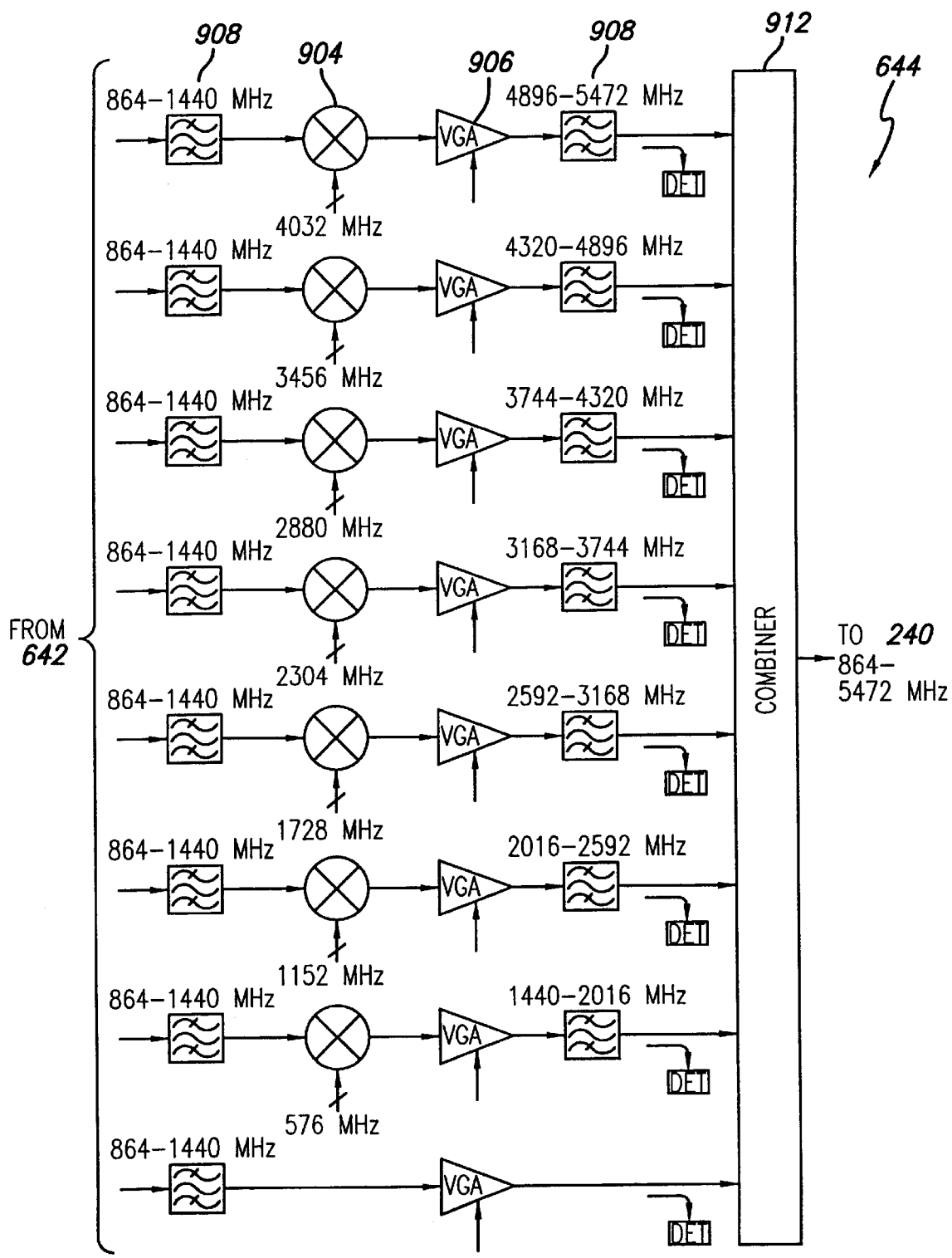
FIG. 9B is a block diagram of a preferred embodiment of RF upconverter 644.

Referring to FIG. 9B, RF up-converter 644 is structured similar to IF up-converter 642 and performs a similar function combining the 8 RF channels received from the IF up-converter 642 just as each IF up-converter combines the 8 IF channels received by it. In more detail, RF up-converter 644 includes eight frequency shifters and a combiner 912. Each frequency shifter includes a mixer 904, various gain blocks 906, and various filter 908 coupled in series to an input of the combiner 912.

RF up-converter 644 operate as follows. Mixer 904 mixes one of the RF channels with a carrier at a specific RF frequency (e.g., 4032 MHz for the top frequency shifter in FIG. 9B), thus frequency upshifting the RF channel to RF frequencies. Gain blocks 906 and filters 908 are used to implement standard amplitude adjustment and frequency filtering. For example, in FIG. 9B, one filter 908 bandpass filters the incoming RF channel and another bandpass filters the produced RF signal, both filters for suppressing artifacts outside the frequency range of interest. Each frequency shifter uses a different frequency (e.g., ranging in equal increments from 0 to 4032 MHz in this example) so combiner 912 simply combines the 8 incoming RF signals to produce the single electrical high-speed channel containing the information of all 8 incoming RF channels or, equivalently, all 64 IF channels received by IF up-converter 642. In this example, the electrical high-speed channel covers the frequency range of 864–5472 MHz.

RF down-converter 624 and IF down-converter 622 implement the reverse functionalities, splitting the RF signal into its 8 constituent RF channels and then splitting each RF channel into its 8 constituent IF channels, respectively, thus producing 64 IF channels (i.e., FDM channels) to be received by demodulator 620.

Referring to FIG. 9A, RF down-converter 624 includes a splitter 920 coupled to eight frequency shifters. Each frequency shifter includes a mixer 924, various gain blocks 926, and various filters 928 coupled in series. Splitter 920 splits the incoming electrical high-speed channel into eight different RF signals and each frequency shifter recovers a different constituent RF channel from the RF signal it receives. Mixer 924 mixes the received RF signal with a carrier at a specific RF frequency (e.g., 4032 MHz for the top frequency shifter in FIG. 9A), thus frequency downshifting the RF signal to its original IF range (e.g., 864–1440 MHz). Filter 928 then filters out this specific IF frequency range. Each frequency shifter uses a different RF frequency with mixer 924 and thus recovers a different .RF channel. The output of RF downconverter 624 is the 8 constituent RF channels.

IF down-converter 622 of FIG. 8A operates similarly. It includes a splitter 820 and 8 frequency shifters, each including a bandpass filter 822 and demodulator 824. Splitter 820 splits the incoming RF channel into eight signals, from which each frequency shifter will recover a different constituent IF channel. Filter 822 isolates the frequency band within the RF channel which contains the IF channels of interest. Demodulator 824 recovers the IF channel by mixing with the corresponding IF carrier. The resulting 64 IF channels are input to demodulator 620.

It should be noted that FIGS. 7–8 are primarily functional and other implementations will be apparent. For example, referring to FIG. 9B, note that the bottom channel occupies the frequency spectrum from 864–1440 MHz and, therefore, no mixer 904 is required. As another example, note that the next to bottom channel is frequency up shifted from the 864–1440 MHz band to the 1440–2016 MHz. In a preferred approach, this is not accomplished in a single step by mixing with a 576 MHz signal. Rather, the incoming 864–1440 MHz signal is frequency up shifted to a much higher frequency range and then frequency down shifted back to the 1440–2016 MHz range. This avoids unwanted interference from the 1440 MHz end of the original 864–1440 MHz signal. Other variations will be apparent.

The FDM aspect of preferred embodiment 400 has been described in the context of combining 64 low-speed channels 240 into a single optical high-speed channel 120. The invention is in no way limited by this example. Different total numbers of channels, different data rates for each channel, different aggregate data rate, and formats and protocols other than the STS/OC protocol are all suitable for the current invention. In fact, one advantage of the FDM approach is that it is easier to accommodate low-speed channels which use different data rates and/or different protocols. In other words, some of the channels 240B may use data rate A and protocol X; while others may use data rate B and protocol Y, while yet others may use data rate C and protocol Z. In the FDM approach, each of these may be allocated to a different carrier frequency and they can be straightforwardly combined so long as the underlying channels are not so wide as to cause the different carriers to overlap. In contrast, in the TDM approach, each channel is allocated certain time slots and, essentially, will have to be converted to a TDM signal before being combined with the other channels.

Another advantage is lower cost. The FDM operations may be accomplished with low-cost components commonly found in RF communication systems. Additional cost savings are realized since the digital electronics such as modulator 640, demodulator 620, and ADM crosspoint 260, operate at a relatively low data rate compared to the aggregate data rate. The digital electronics need only operate as fast as the data rate of the individual low-speed channels 240. This is in contrast to TDM systems, which require a digital clock rate that equals the aggregate transmission rate. For OC-192, which is the data rate equivalent to the high-speed channels 120 in FDM node 400, this usually requires the use of relatively expensive gallium arsenide integrated circuits instead of silicon.

Moving further along the transmit data path 210B, E/O converter 240 preferably includes an optical source and an external optical modulator. Examples of optical sources include solid state lasers and semiconductor lasers. Example external optical modulators include Mach Zehnder modulators and electro-absorptive modulators. The optical source produces an optical carrier, which is modulated by the electrical high-speed channel as the carrier passes through the modulator. The electrical high-speed channel may be predistorted in order to increase the linearity of the overall system. Alternatively, E/O converter 240 may be an internally modulated laser. In this case, the electrical high-speed channel drives the laser, the output of which will be a modulated optical beam (i.e., the optical high-speed channel 120B).

The wavelength of the optical high-speed channel may be controlled using a number of different techniques. For example, a small portion of the optical carrier may be extracted by a fiber optic splitter, which diverts the signal to a wavelength locker. The wavelength locker generates an error signal when the wavelength of the optical carrier deviates from the desired wavelength. The error signal is used as feedback to adjust the optical source (e.g., adjusting the drive current or the temperature of a laser) in order to lock the optical carrier at the desired wavelength. Other approaches will be apparent.

The counterpart on the receive data path 210A is O/E converter 220, which typically includes a detector such as an avalanche photo-diode or PIN-diode. In an alternate approach, O/E converter 220 includes a heterodyne detector. For example, the heterodyne detector may include a local oscillator laser operating at or near the wavelength of the incoming optical high-speed channel 120A. The incoming optical high-speed channel and the output of the local oscillator laser are combined and the resulting signal is detected by a photodetector. The information in the incoming optical high-speed channel can be recovered from the output of the photodetector. One advantage of heterodyne detection is that the thermal noise of the detector can be overcome and shot noise limited performance can be obtained without the use of fiber amplifiers.

Figure 10C:
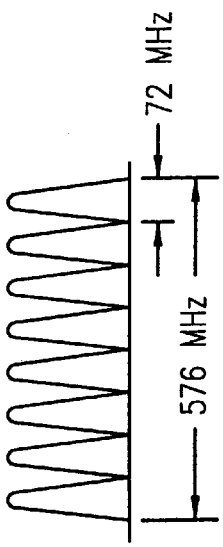
FIGS. 10A–10E are frequency diagrams illustrating operation of FDM node 400.
Figure 10B:
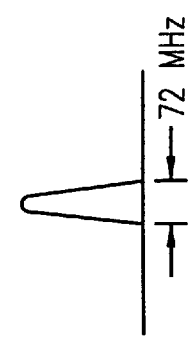
Figure 10A:
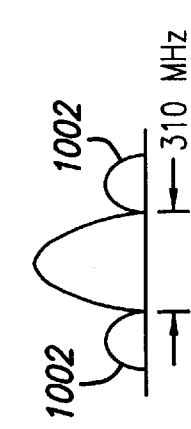

FIGS. 10A–10D are frequency diagrams illustrating signals at various points along the transmit data path 210B of FDM node 400. FIG. 10A depicts the tributaries 160B which is assumed to be an OC-3 data signal for this example. In the time domain, the tributary is a binary signal with a bit rate of 155 Mbps. In the frequency domain, the spectrum of tributary 160B has significant sidelobes 1002 due to the on-off nature of the signal. The low-speed channels 240,250, which are STS-3 signals in this example, have spectra similar to that shown in FIG. 10A.

FIG. 10B depicts the spectrum of a signal produced by modulator 640 from one low-speed channel 240B. As described previously, modulator 640 applies error-control coding to reduce SNR requirements. Modulator 640 also uses digital filtering and raised cosine pulse shapes to significantly reduce spectral sidelobes. The use of QAM modulation further adds to the spectral efficiency of the resulting signal. The end result is a spectrally efficient waveform (i.e., a narrow spectrum) with significantly reduced sidelobes, as shown in FIG. 10B.

Figure 10E:
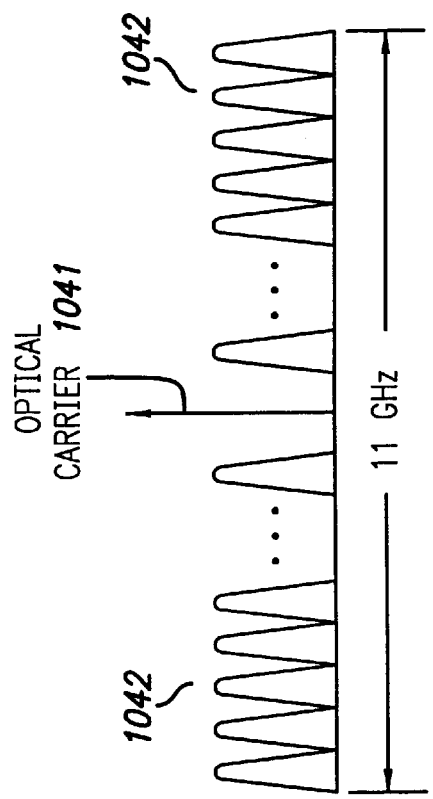
Figure 10D:
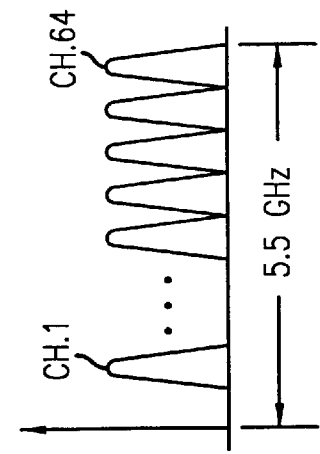

FIGS. 10C–10D illustrate the spectra resulting from the IF up-converter 642 and RF up-converter 644, respectively. The IF up-converter 642 primarily FDM multiplexes eight of the waveforms from FIG. 10B into a single signal, resulting in the eight-lobed waveform of FIG. 10C which is centered at IF frequencies. The RF up-converter 644 essentially repeats this process, resulting in a 64-lobed (one lobe for each low-speed channel 240B) waveform shown in FIG. 10D.

FIG. 10E illustrates the spectra of the optical high-speed channel 120. The RF waveform of FIG. 10D is intensity modulated. The result is a double sideband signal with a central optical carrier 1041. Each sideband 1042 has the same width as the RF waveform, resulting in a total bandwidth of approximately 11 GHz.

Because FDM node 400 uses spectrally efficient QAM modulation and pulse shaping, the resulting optical waveform is significantly more bandwidth-efficient than other optical transmission methods. FIG. 11 show the spectra corresponding to three different approaches to transmit 10 Gbps. Spectrum 1100 is produced by FDM node 400 and occupies approximately 11 GHz of bandwidth as described above. In contrast, spectrum 1110 is the result of transmitting 10 Gbps using traditional on-off keying. In other words, spectrum 1110 is the spectrum of an OC-192 waveform. The null-to-null bandwidth for this spectrum is about 20 GHz. Spectrum 1120 is the spectrum of a four-wavelength WDM system transmitting 2.5 Gbps on each wavelength. The closest spacing generally used in DWDM systems today is about 50 GHz. The total occupied bandwidth is therefore about 150 GHz. Note that spectrum 1100 occupies significantly less bandwidth than either of its counterpart 1110 or 1120. In addition, note that spectrum 1100 is narrow enough that it could be transmitted on a single wavelength of a DWDM system with extremely close wavelength spacing, as will be described further below.

Another less obvious advantage of FDM over TDM is illustrated by FIG. 11. In order for the OC-192 waveform 1110 to be received distortion-free, the channel must have a fairly flat response over the entire 20 GHz bandwidth of interest. The FDM waveform 1100, however, is composed of 64 much narrower lobes, each of which represents a separate data channel. Hence, it is only necessary for the channel to be relatively flat over the bandwidth of an individual channel, or approximately 72 MHz, in order for that channel to be received distortion-free. Moreover, any distortion across the bandwidth of a single channel can be removed by the digital equalizer 724 in demodulator 620; whereas it is much more difficult to realize such an equalizer for waveform 1110.

Figure 12A:
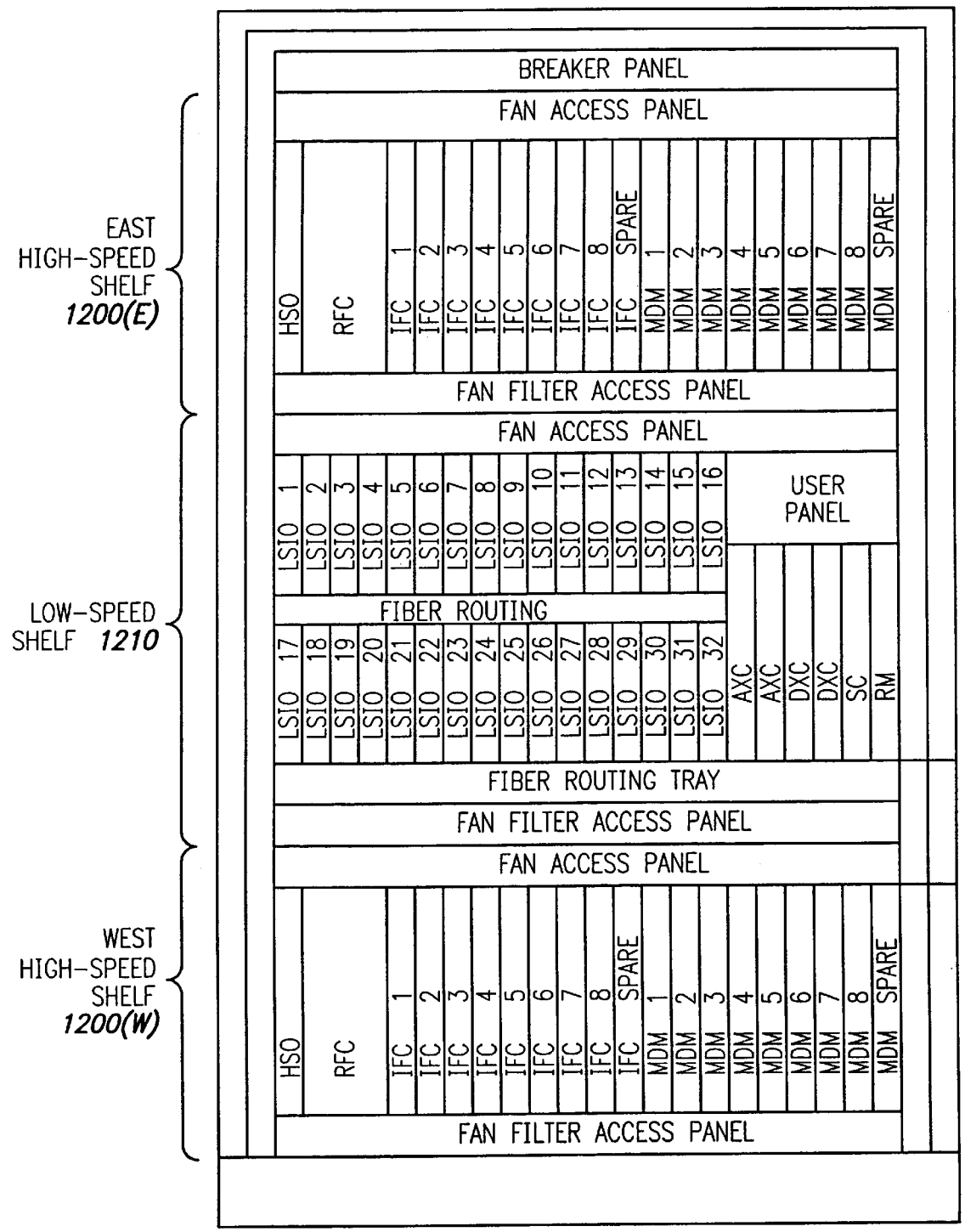
FIGS. 12A–12C are figures illustrating a preferred physical layout for FDM node 400.
Figure 12B:
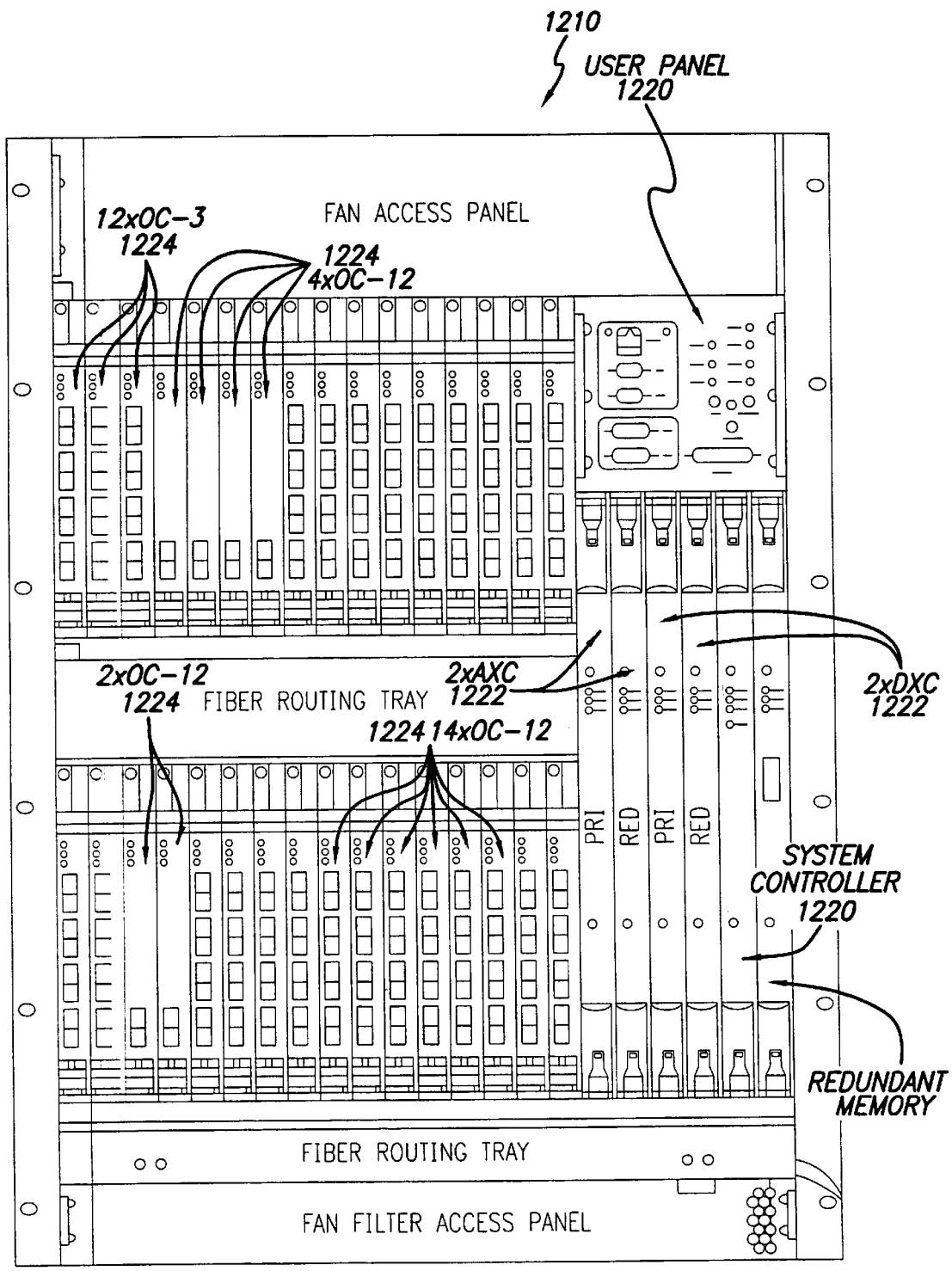
Figure 12C:
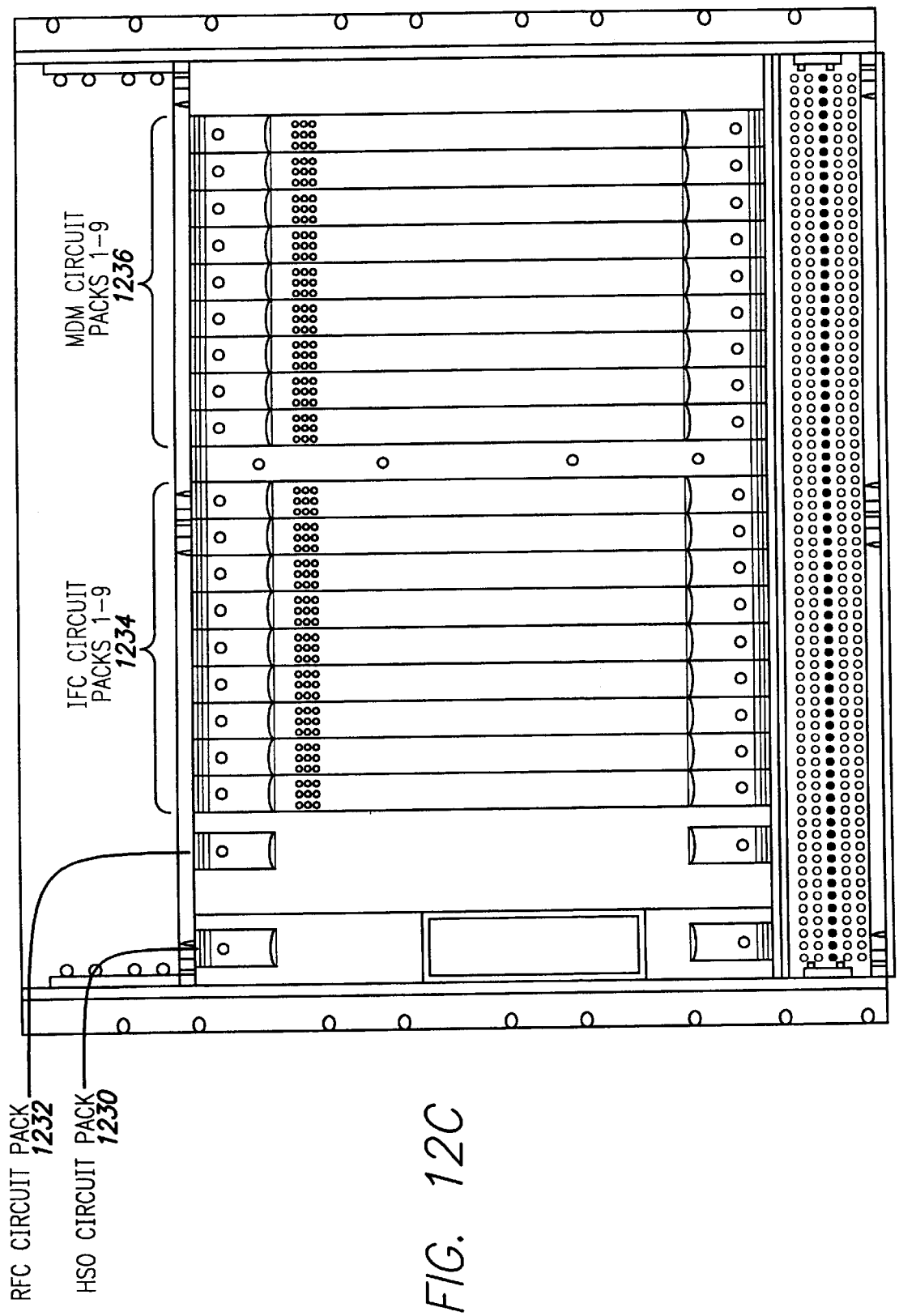

FIGS. 12A–12C illustrate a preferred physical layout for FDM node 400. As shown in FIG. 12A, FDM node 400 is a full-height electronics rack with three shelves: east high-speed shelf 1200(E), west high-speed shelf 1200(W), and low-speed shelf 1210. Each shelf includes a number of cards, with electrical communications between the cards preferably occurring via a backplane for the shelf. Generally speaking, east high-speed shelf 1200(E) implements the functionality of east high-speed system 200(E) of FIG. 4, west high-speed shelf 1200(W) implements the functionality of west high-speed system 200(W), and low-speed shelf 1210 implements the functionality of the low-speed system 201 and control system 290.

FIG. 12B is a detail of the low-speed shelf 1210. The first three cards 1220 are dedicated to the control system 290, including diagnostics. Four cards 1222 implement the ADM crosspoint 260, with two of the four cards providing primary service, as indicated by "(Pri.)" and the other two providing redundancy as indicated by "(Red.)" The remaining 32 half-height cards 1224 implement the low-speed converters 270 and 275 as transceivers. In this implementation, all tributaries 160 are optical fibers (i.e., either OC-3 or OC-12) and are accessible from the front of the low-speed converter cards 1224.

FIG. 12C is a detail of a high-speed shelf 1200. One card 1230 implements an optical transceiver (i.e., the O/E converter 220 and E/O converter 240), with the optical fibers carrying the optical high-speed channels 120 plugging into the front of this card 1230. Another card 1232 implements the RF up-converter 644 and RF down-converter 624. Nine cards 1234 are used for the IF up-converter 642 and IF down-converter 622, with the ninth providing redundancy. Another nine cards 1236 house the modulator 640 and demodulator 620, again with the ninth providing redundancy.

The modular physical layout shown in FIG. 12, coupled with the modularity of the FDM approach, simplifies servicing and reconfiguration. For example, if one of the IF cards 1234 fails, the FDM approach allows the control system 290 to easily reconfigure the ADM crosspoint 260 to re-route traffic to the redundant IF card while the failed card is replaced. The FDM node 400 remains functional during the replacement. As another example, if the primary ADM crosspoint card 1222 fails, control system 290 automatically routes traffic to the redundant ADM crosspoint card. As another example, if some of the tributaries use a protocol other than OC-3 or OC-12, some of the low-speed converter cards 1224 may be replaced with converter cards appropriate for the desired protocol. Alternate frequency maps or modulation schemes may also be implemented by replacing some or all of the modem, IF and/or RF cards 1236, 1234 or 1232.

Note that the modularity allows the mixing and matching of various schemes. For example, three of the IF cards 1234 may use one frequency map while the remaining five may use a different frequency map.

The modularity of the FDM approach also makes the overall system more flexible and scaleable. For example, frequency bands may be allocated to compensate for fiber characteristics. For a 70 km fiber, there is typically a null around 7 GHz. With the FDM approach, this null may be avoided simply by not allocating any frequency bands around this null to any low-speed channel 240. As a variant, each of the frequency bands may be amplified or attenuated independently of the others, for example in order to compensate for the transmission characteristics of that particular frequency band.

As a final example, additional capacity may be added to FDM node 400 simply by allocating additional frequency bands to the current frequency map and then adding the corresponding cards. Eight more low-speed channels at STS-3 data rates could be added by adding a ninth functioning IF card 1234 and modifying the RF card 1232 accordingly. The additional RF channel might be added at the high frequency 5472 MHz end of the current frequency mapping. Other variations will be apparent.

Various design tradeoffs are inherent in the design of a specific embodiment of FDM node 100 for use in a particular application. For example, the type of Reed Solomon encoding may be varied or other types of forward error correction codes (or none at all) may be used, depending on the system margin requirements. As another example, in one variation of QAM, the signal lattice is evenly spaced in complex signal space but the total number of states in the QAM constellation is a design parameter which may be varied. The optimal choices of number of states and other design parameters for modulator/demodulator 640/620 will depend on the particular application. Furthermore, the modulation may differ on some or all of the low speed channels. For example, some of the channels may use PSK modulation, others may use 16-QAM, while still others may use an arbitrary complex constellation. The choice of a specific FDM implementation also involves a number of design tradeoffs, such as the choices of intermediate frequencies, whether to implement components in the digital or in the analog domain, and whether to use multiple stages to achieve the multiplexing.

As a numerical example, in one embodiment, a (187,204) Reed-Solomon encoding may be used with a rate ¾ 16-QAM trellis code. The (187,204) Reed-Solomon encoding transforms 187 bytes of data into 204 bytes of encoded data and the rate ¾ 16-QAM trellis code transforms 3 bits of information into a single 16-QAM symbol. In this example, a single low-speed channel 240B, which has a base data rate of 155 Mbps would require a symbol rate of 155 Mbps×(204/187)×(⅓)=56.6 Megasymbols per second. Including an adequate guard band, a typical frequency band would be about 72 MHz to support this symbol rate. Suppose, however, that it is desired to decrease the bandwidth of each frequency band. This could be accomplished by changing the encoding and modulation. For example, a (188,205) Reed-Solomon code with a rate ⅚ 64-QAM trellis code would require a symbol rate of 155 Mbps×(205/188)×(⅕)= 33.9 Megasymbols per second or 43 MHz frequency bands, assuming proportional guard bands. Alternately, if 72 MHz frequency bands were retained, then the data rate could be increased.

As another example, an optical modulator 240 with better linearity will reduce unwanted harmonics and interference, thus increasing the transmission range of FDM node 100. However, optical modulators with better linearity are also more difficult to design and to produce. Hence, the optimal linearity will depend on the particular application. An example of a system-level tradeoff is the allocation of signal power and gain between the various components. Accordingly, many aspects of the invention have been described in the context of preferred embodiment 400 but it should be understood that the invention is not limited to this specific embodiment.

Figure 13:
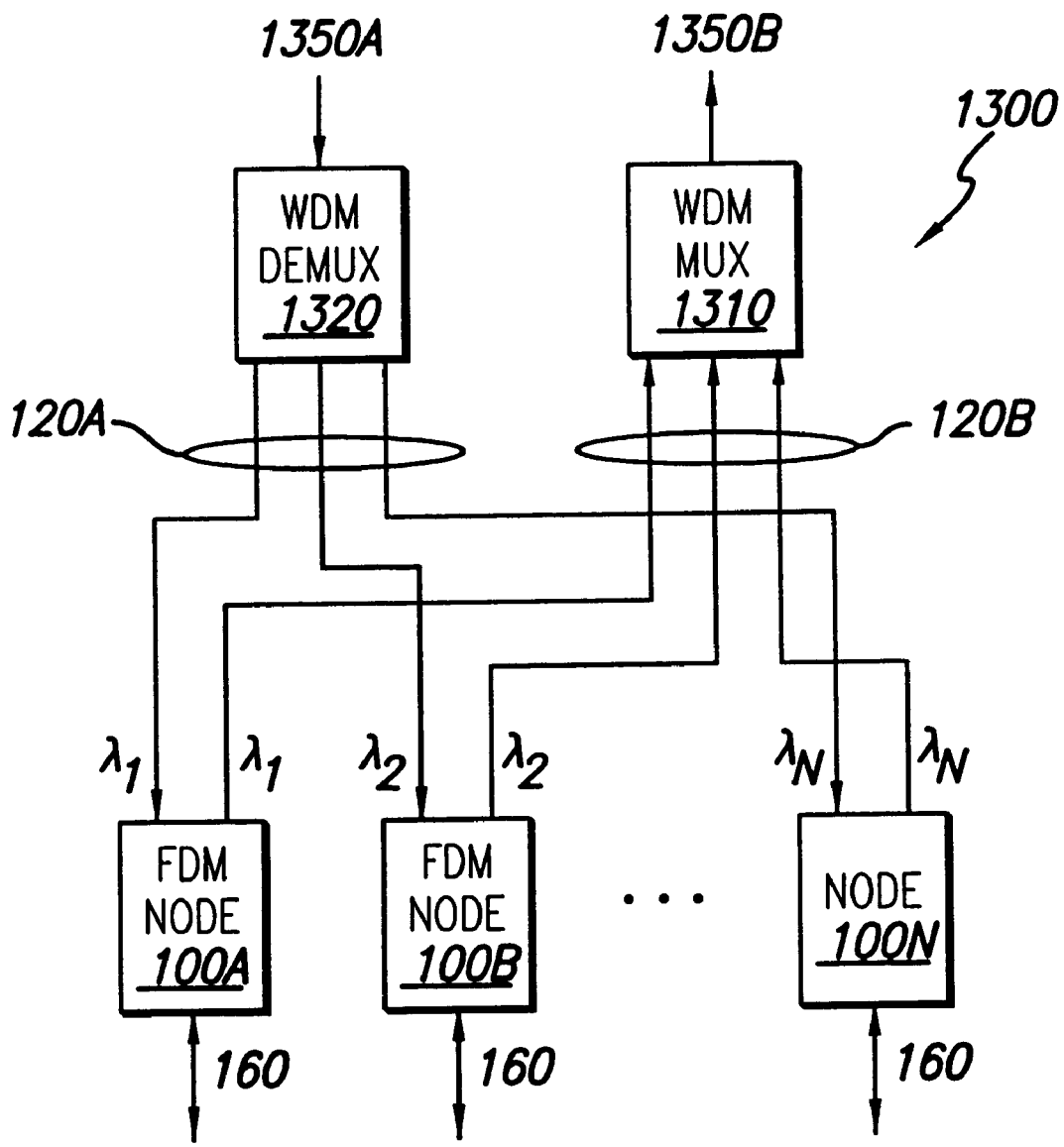
FIG. 13 is a block diagram of another FDM node 1300 in accordance with the present invention.

FIG. 13 is a block diagram of another FDM node 1300 in accordance with the present invention. Node 1300 utilizes wavelength-division multiplexing (WDM) in conjunction with the FDM principles described above in order to further increase the data transported over a single fiber. Node 1300 includes a number of FDM nodes 100, a wavelength division multiplexing (WDM) multiplexer 1310, and a WDM demultiplexer 1320. The outgoing high-speed channels 120B of each FDM node 100 are coupled to the WDM multiplexer 1310. As described previously, each FDM node 100 produces an optical high-speed channel 120B, but each node 100 uses a different wavelength. For example, in FIG. 13, optical high-speed channels 120B are characterized by wavelengths λ1–λN. The various optical high-speed channels 120 are WDM multiplexed by WDM multiplexer 1310 to form the multi-wavelength optical channel 1350IB, which is transmitted across an optical fiber 1 (not shown). In the receive direction, WDM demultiplexer 1320 separates an incoming multi-wavelength channel 1350A into its constituent high-speed channels 120A using WDM techniques, which are fed to the corresponding FDM nodes 100 and then processed as described previously.

In an alternate embodiment, not all of the nodes 100 comprising node 1300 must be FDM nodes. For example, some of the nodes may be based in part or in fall on TDM. FDM nodes 100 and TDM nodes may be combined in order to take advantage of the flexibility of FDM nodes while still making use of legacy TDM nodes. Other combinations and types of nodes, including ones based on approaches other than FDM or TDM, may be used.

It should be noted that the embodiments described above are exemplary only and many other alternatives will be apparent. For example, the various functionalities shown above may be switched in order. For example, in preferred embodiment 400, the tributaries 160 and low-speed channels 240,250 were digital signals, and the ADM crosspoint 260 implemented the add/drop functionality on these digital signals. In the transmit direction, the high-speed systems 200 modulate a carrier with the digital low-speed channels 240B, producing an analog signal; while in the receive direction, the high-speed system 200 demodulates the received analog signal to produce the digital low-speed channels 240A. In an alternate embodiment, the modulation/demodulation occurs on the tributary side of the ADM crosspoint 260 rather than on the high-speed system side. As a result, the low-speed channels 240,250, are analog signals and the ADM crosspoint 260 implements the add/drop functionality on these analog signals. In the transmit direction, the tributaries 160B are modulated to produce analog low-speed channels 250B, possibly but not necessarily at baseband. These analog low-speed channels 250B would then enter the ADM crosspoint 260 to be add/dropped. Similarly, in the receive direction, incoming analog low-speed channels 240 would first be add/dropped by ADM crosspoint 260 before being demodulated into the corresponding digital tributaries 160. One advantage of this approach is that no modulation/demodulation is required for channels which are passed-through a node. Alternately, the tributaries 160 themselves could be analog signals.

In a variant of the above alternative, the analog low-speed channels 250,240 are sampled on the tributary side of ADM crosspoint 260. In other words, the low-speed channels 250,240 are modulated digital signals. This allows the ADM crosspoint 260 to implement the add/drop functionality on digital signals, while also preserving the advantage of not requiring any modulation/demodulation for channels which are being passed-through a node.

As another example, the discussion of embodiment 400 noted that the frequency division multiplexing preferably was implemented in two stages: a first stage multiplexing low-speed channels into RF channels, and a second stage multiplexing the RF channels into the RF electrical high-speed channel. In embodiment 400, the ADM crosspoint 260 was located on the tributary side of both of these stages. In an alternate embodiment, the ADM crosspoint 260 is located between these two stages. In this case, the "low-speed channels" to the ADM crosspoint 260 are actually the RF channels and the ADM crosspoint 260 implements the add/drop functionality on these RF channels.

As yet another example, in the embodiments discussed above, the low-speed channels 240 were combined into an electrical high-speed channel using solely frequency division multiplexing. For example, in embodiment 400, each of the 64 low-speed channels 240B was effectively placed on a carrier of a different frequency and these 64 carriers were then effectively combined into a single electrical high-speed channel solely on the basis of different carrier frequencies. This is not meant to imply that the invention is limited solely to frequency division multiplexing to the exclusion of all other approaches for combining signals. In fact, in alternate embodiments, other approaches may be used in conjunction with frequency division multiplexing. For example, in one approach, the 64 low-speed channels 240B of FIG. 4 may be combined into a single high-speed channel 120B in two stages, only the second of which is based on frequency division multiplexing. In particular, the 64 low-speed channels 240B are divided into 16 groups of 4 channels each. Within each group, the 4 channels are combined into a single signal using 16-QAM (quadrature amplitude modulation). The resulting QAM-modulated signals are frequency-division multiplexed to form the electrical high-speed channel.

As a final example, it should be clear that the tributaries 160 may themselves be combinations of signals. For example, some or all of the OC-3/OC-12 tributaries 160 in embodiment 400 may be the result of combining several lower data rate signals, using either frequency division multiplexing or other techniques. In one approach, time division multiplexing may be used to combine several lower data rate signals into a single OC-3 signal, which serves as a tributary 160 for embodiment 400.

Although the invention has been described in considerable detail with reference to certain preferred embodiments thereof, other embodiments are possible. Therefore, the scope of the appended claims should not be limited to the description of the preferred embodiments contained herein.

What is claimed is:

1. An Frequency-Division multiplexing FDM node for use in optical communications networks comprising:
   an optical to electrical O/E converter for converting a first optical high-speed channel to a first electrical high-speed channel;
   a frequency division demultiplexer coupled to the O/E converter for frequency division demultiplexing the first electrical high-speed channel into a first plurality of low-speed channels;
   an electrical add-drop multiplexing ADM crosspoint having a plurality of inputs and outputs, a first set of the inputs coupled to the frequency division demultiplexer, the ADM crosspoint for switchably coupling the inputs to the outputs;
   a frequency division multiplexer coupled to a first set of the outputs of the ADM crosspoint for converting a second plurality of low-speed channels into a second electrical high-speed channel; and
   an electrical to optical E/O converter coupled to the frequency division multiplexer for converting the second electrical high-speed channel to a second optical high-speed channel.

2. The device of claim 1 wherein the first and second low-speed channels conform to an synchronous transport signal STS protocol.

3. The device of claim 1 wherein the frequency division multiplexer comprises:
   a Quadrature amplitude modulation QAM modulator for QAM modulating the second plurality of low-speed channels.

4. The device of claim 1 wherein the frequency division multiplexer comprises:
   an intermediate Frequency IF up-converter coupled to the first set of outputs of the ADM crosspoint for frequency division multiplexing a plurality of IF channels into a plurality of radio Frequency RF channels, the IF channels based on the second low-speed channels, and
   an RF up-converter coupled to the IF up-converter for frequency division multiplexing the plurality of RF channels into the second electrical high-speed channel.

5. The device of claim 1 wherein the frequency division multiplexer comprises:
   a plurality of variable gain blocks for independently adjusting an amplitude of each of the second low-speed channels.

6. The device of claim 1 wherein the frequency division multiplexer converts the second low-speed channels into the second electrical high-speed channel according to a frequency mapping in which each low-speed channel is allocated a specific frequency band within the second electrical high-speed channel and the frequency bands are not all contiguous.

7. The device of claim 1 wherein the frequency division multiplexer converts the second low-speed channels into the second electrical high-speed channel according to a frequency mapping in which each low-speed channel is allocated a specific frequency band within the second electrical high-speed channel and the number of low-speed channels may be varied by varying the number of frequency bands in the second electrical high-speed channel.

8. The device of claim 1 wherein the frequency division multiplexer comprises:
   a modulator for applying a modulation to each of the second low-speed channels, the modulation independently selectable for each second low-speed channel.

9. The device of claim 1 wherein the second optical high-speed channel is characterized by a wavelength in the 1.3 micron region.

10. The device of claim 1 wherein the second optical high-speed channel is characterized by a wavelength in the 1.55 micron region.

11. The device of claim 1 further comprising
    a wavelength division multiplexer coupled to the E/O converter for combining the second optical high-speed channel with other optical high-speed channels at other wavelengths.

12. The device of claim 1 wherein the ADM crosspoint is further for switchably coupling any input to any output.

13. The device of claim 1 wherein the ADM crosspoint is non-blocking.

14. The device of claim 1 further comprising
    a low-speed input converter coupled to a second set of inputs to the ADM crosspoint, for converting tributaries received by the low-speed input converter to low-speed channels.

15. The device of claim 14 wherein the tributaries are characterized by at least two different data rates.

16. The device of claim 14 wherein the tributaries are characterized by at least two different communications protocols.

17. An Frequency-division multiplexing FDM node for use in optical communications networks comprising:
    a quadrature amplitude modulation QAM modulator for QAM modulating a plurality of low-speed channels into a plurality of FDM channels, at least one of the low-speed channels characterized by a data rate greater than 100 million bits per second;
    a frequency division multiplexer coupled to the QAM modulator for converting the FDM channels into an electrical high-speed channel; and
    an electric to optical E/O converter coupled to the frequency division multiplexer for converting the electrical high-speed channel to an optical high-speed channel.

18. The device of claim 17 wherein the low-speed channels conform to an synchronous transport signal STS protocol.

19. The device of claim 17 further comprising:
a forward error correction encoder coupled to the QAM modulator for applying a forward error correct code to the low-speed channels.

20. The device of claim 17 further comprising
a wavelength division multiplexer coupled to the E/O converter for combining the optical high-speed channel with other optical high-speed channels at other wavelengths.

21. The device of claim 17 further comprising
a low-speed input converter coupled to the QAM modulator for converting tributaries received by the low-speed input converter to the low-speed channels.

22. The device of claim 21 wherein the tributaries are characterized by at least two different data rates.

23. The device of claim 21 wherein the tributaries are characterized by at least two different communications protocols.

24. An Frequency-division multiplexing FDM node for use in optical communications networks comprising:
an optical to electrical O/E converter for converting an optical high-speed channel to an electrical high-speed channel;
a frequency division demultiplexer coupled to the O/E converter for frequency division demultiplexing the electrical high-speed channel into a plurality of FDM channels;
a Quadrature amplitude modulation QAM demodulator coupled to the frequency division demultiplexer for QAM demodulating the FDM channels into a plurality of low-speed channels, at least one of the low-speed channels characterized by a data rate greater than 100 million bits per second.

25. The device of claim 24 wherein the low-speed channels conform to an synchronous transport signal STS protocol.

26. The device of claim 24 further comprising
a wavelength division demultiplexer coupled to the E/O converter for separating the optical high-speed channel from a multi-wavelength optical channel containing a plurality of optical high-speed channels.

27. The device of claim 24 further comprising
a low-speed output converter coupled to the QAM demodulator for converting the low-speed channels to tributaries.

28. The device of claim 27 wherein the tributaries are characterized by at least two different data rates.

29. The device of claim 27 wherein the tributaries are characterized by at least two different communications protocols.

30. In an optical communications networks, a method for transporting data comprising:
receiving a first optical high-speed channel;
converting the first optical high-speed channel to a first electrical high-speed channel;
frequency division demultiplexing the first electrical high-speed channel into a plurality of first low-speed channels, the first low-speed channels to be passed-through to a second optical high-speed channel;
switchably coupling the first low-speed channels to second low-speed channels;
frequency division multiplexing the second low-speed channels to produce a second electrical high-speed channel; and
converting the second electrical high-speed channel to a second optical high-speed channel.

31. The method of claim 30 wherein the first and second low-speed channels conform to an STS protocol.

32. The method of claim 30 wherein the step of frequency division multiplexing comprises:
QAM modulating the second low-speed channels.

33. The method of claim 30 wherein the step of frequency division multiplexing comprises:
frequency division multiplexing a plurality of intermediate Frequency IF channels into a plurality of radio Frequency RF channels, the IF channels based on the second low-speed channels, and
frequency division multiplexing the plurality of RF channels into the second electrical high-speed channel.

34. The method of claim 30 wherein the step of frequency division multiplexing comprises:
independently adjusting an amplitude of each of the second low-speed channels.

35. The method of claim 30 wherein the step of frequency division multiplexing comprises:
frequency division multiplexing the second low-speed channels into the second electrical high-speed channel according to a frequency mapping in which each low-speed channel is allocated a specific frequency band within the second electrical high-speed channel and the frequency bands are not all contiguous.

36. The method of claim 30 wherein the step of frequency division multiplexing comprises:
frequency division multiplexing the second low-speed channels into the second electrical high-speed channel according to a frequency mapping in which each low-speed channel is allocated a specific frequency band within the second electrical high-speed channel; and
varying the number of frequency bands in the second electrical high-speed channel responsive to variations in the number of low-speed channels.

37. The method of claim 30 wherein the step of frequency division multiplexing comprises:
applying a modulation to each of the second low-speed channels, the modulation independently selectable for each second low-speed channel.

38. The method of claim 30 wherein the second optical high-speed channel is characterized by a wavelength in the 1.3 micron region.

39. The method of claim 30 wherein the second optical high-speed channel is characterized by a wavelength in the 1.55 micron region.

40. The method of claim 30 further comprising:
wavelength division multiplexing the second optical high-speed channel with other optical high-speed channels to form a multi-wavelength optical channel.

41. The method of claim 30 wherein the step of switchably coupling the first low-speed channels to second low-speed channels comprises switchably coupling any first low-speed channel to any second low-speed channel.

42. The method of claim 30 wherein the step of switchably coupling the first low-speed channels to second low-speed channels comprises at least one step of the group consisting of:
switchably coupling multiple first low-speed channels to a single second low-speed channel; and
switchably coupling a single first low-speed channels to multiple second low-speed channels.

43. The method of claim 30 further comprising:
receiving a plurality of tributaries to be added to the second optical high-speed channel;

converting the tributaries to third low-speed channels; and switchably coupling the third low-speed channels to the second low-speed channels.

44. The method of claim 43 wherein the tributaries are characterized by at least two different data rates.

45. The method of claim 43 wherein the tributaries are characterized by at least two different communications protocols.

46. In an optical communications networks, a method for transmitting data comprising:

receiving a plurality of low-speed channels;

Quadrature amplitude modulation QAM modulating the low-speed channels into a plurality of Frequency division multiplexing FDM channels, at least one of the low-speed channels characterized by a data rate greater than 100 million bits per second;

a frequency division multiplexing the FDM channels into an electrical high-speed channel; and converting the electrical high-speed channel to an optical high-speed channel.

47. The method of claim 46 wherein the low-speed channels conform to an synchronous transport signal STS protocol.

48. The method of claim 46 further comprising:

applying a forward error correct code to the low-speed channels.

49. The method of claim 46 further comprising wavelength division multiplexing the optical high-speed channel with other optical high-speed channels to form a multi-wavelength optical channel.

50. The method of claim 46 further comprising receiving a plurality of tributaries; and converting the tributaries to the low-speed channels.

51. The method of claim 50 wherein the tributaries are characterized by at least two different data rates.

52. The method of claim 50 wherein the tributaries are characterized by at least two different communications protocols.

53. In an optical communications networks, a method for receiving data comprising:

receiving an optical high-speed channel;

converting the optical high-speed channel to an electrical high-speed channel;

frequency division demultiplexing the electrical high-speed channel into a plurality of Frequency-division multiplexing FDM channels;

quadrature amplitude modulation QAM demodulating the FDM channels into a plurality of low-speed channels, at least one of the low-speed channels characterized by a data rate greater than 100 million bits per second.

54. The method of claim 53 wherein the low-speed channels conform to an STS protocol.

55. The method of claim 53 further comprising receiving a multi-wavelength optical channel; and wavelength division demultiplexing the multi-wavelength optical channel into a plurality of optical high-speed channels.

56. The method of claim 53 further comprising converting the low-speed channels to tributaries.

57. The method of claim 56 wherein the tributaries are characterized by at least two different data rates.

58. The method of claim 56 wherein the tributaries are characterized by at least two different communications protocols.

* * * * *